(12) United States Patent
Bozkurt et al.

(10) Patent No.: US 12,255,285 B2
(45) Date of Patent: Mar. 18, 2025

(54) GEL POLYMER ELECTROLYTE SUPERCAPACITOR

(71) Applicant: Imam Abdulrahman Bin Faisal University, Dammam (SA)

(72) Inventors: Ayhan Bozkurt, Dammam (SA); Emre Cevik, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 41 days.

(21) Appl. No.: 18/476,418

(22) Filed: Sep. 28, 2023

(65) Prior Publication Data

US 2024/0021876 A1  Jan. 18, 2024

Related U.S. Application Data

(63) Continuation of application No. 16/660,267, filed on Oct. 22, 2019, now Pat. No. 11,817,554.

(51) Int. Cl.
H01M 10/0565 (2010.01)
H01G 11/56 (2013.01)
H01M 10/052 (2010.01)

(52) U.S. Cl.
CPC ........ *H01M 10/0565* (2013.01); *H01G 11/56* (2013.01); *H01M 10/052* (2013.01)

(58) Field of Classification Search
CPC . H01M 10/0565; H01M 10/052; H01G 11/56
See application file for complete search history.

(56) References Cited

U.S. PATENT DOCUMENTS

| 10,107,736 B2 | 10/2018 | Clare et al. |
| 2012/0134072 A1 | 5/2012 | Bae |
| 2021/0118626 A1 | 4/2021 | Bozkurt |

FOREIGN PATENT DOCUMENTS

| CN | 103943363 A | 7/2014 |
| CN | 106449174 B | 9/2018 |
| JP | 6452265 B2 | 1/2019 |
| KR | 10-1389826 B1 | 5/2014 |
| WO | WO 2016/110126 A1 | 7/2016 |

OTHER PUBLICATIONS

Emre Cevik, et al., "Redox mediated PAMPS/Mo hydrogels for highly effective flexible supercapacitors", Chemelectrochem, vol. 6, No. 11, Apr. 29, 2019, 2 pages (Abstract only).

(Continued)

*Primary Examiner* — Brian R Ohara
*Assistant Examiner* — Patrick Marshall Greene
(74) *Attorney, Agent, or Firm* — Oblon, McClelland, Maier & Neustadt, L.L.P.

(57) ABSTRACT

Gel polymer electrolytes comprising molybdate(VI) salts dispersed in a hydrogel matrix. The hydrogel matrix contains reacted units of an acrylamide (e.g. 2-acrylamido-2-methyl-1-propanesulfonic acid) and optionally an additional monomer. A supercapacitor including the gel polymer electrolyte and electrodes arranged between the electrolyte is also specified. This supercapacitor is evaluated on its specific capacitance, energy density, power density, resistance, as well as cycling stability.

16 Claims, 14 Drawing Sheets

(56) References Cited

OTHER PUBLICATIONS

Seung Won Kang, et al., "High-Efficiency Flexible and Foldable Paper-Based Supercapacitors Using Water-Dispersible Polyaniline-Poly(2-acrylamido-2-methyl-1-propanesulfonic acid) and Poly(vinyl alcohol) as Conducting Agent and Polymer Matrix", Macromolecular Research, vol. 26, Issue 3, Mar. 2018, pp. 226-232 (Abstract only).

Amir Abul Kalam, et al., "Polyaniline-poly(2-acrylamido-2-methyl-1-propanesulfonic acid) electrodes coated on plasma-treated thiolene-based polymer substrates for high-efficiency electrochemical capacitors", Polymer Bulletin, vol. 74, Issue 7, Jul. 2017, pp. 2657-2669 (Abstract only).

Kanjun Sun, et al., "A simple and high-performance supercapacitor based on nitrogen-doped porous carbon in redox-mediated sodium molybdate electrolyte", Electrochimica Acta, vol. 158, Mar. 10, 2015, pp. 361-367 (Abstract only).

Senthilkumar, S. T., et al. "High performance solid-state electric double layer capacitor from redox mediated gel polymer electrolyte and renewable tamarind fruit shell derived porous carbon." & "Supporting Information." ACS applied materials & interfaces 5.21 ( 2013): 10541-10550. (Year: 2013).

English machine translation of Nam et al. (KR 101389826 B1) (Year: 2014).

English machine translation of Liu et al. (CN 103943363 A) (Year: 2014).

Komaba, Shinichi, Naoaki Kumagai, and Yoichi Kataoka. "Influence of manganese (II), cobalt (II), and nickel (II) additives in electrolyte on performance of graphite anode for lithium-ion batteries." Electrochimica acta 47.8 (2002): 1229-1239. (Year: 2002).

Xie, Yi bing, and Yanchen Zhang. "Electrochemical performance of carbon paper supercapacitor using sodium molybdate gel polymer electrolyte and nickel molybdate electrode." Journal of Solid State Electrochemistry 23.6 (2019): 1911-1927. (Year: 2019).

Dubai, Deepak P., et al. "A high voltage solid state symmetric supercapacitor based on graphene-polyoxometalate hybrid electrodes with a hydroquinone doped hybrid gel-electrolyte." Journal of Materials Chemistry A 3.46 (2015): 23483-23492. (Year: 2015).

Iwaku, Masahiro, et al. "Electrochemical Behavior of Ferrocene in a Polymethacrylate Gel Electrolyte." Denki Kagaku oyobi Kogyo Butsuri Kagaku 65.6 (1997): 501-503. (Year: 1997).

Luo, Yangxi, et al. "A high-performance electrochemical supercapacitor based on a polyaniline/reduced graphene oxide electrode and a copper (ii) ion active electrolyte." Physical Chemistry Chemical Physics 20.1 (2018): 131-136. (Year: 2018).

Veerasubramani, Ganesh Kumar, et al. "Enhanced electrochemical performances of graphene based solid-state flexible cable type supercapacitor using redox mediated polymer gel electrolyte." Carbon 105 (2016): 638-648. (Year: 2016).

PAMPS

PAMPS/ Mo₁

PAMPS/ Mo₅

PAMPS/ Mo₁₀

GEL POLYMER ELECTROLYTE SUPERCAPACITOR

CROSS-REFERENCE TO RELATED APPLICATIONS

The present application is a Continuation of U.S. application Ser. No. 16/660,267, now allowed, having a filing date of Oct. 22, 2019.

STATEMENT OF ACKNOWLEDGEMENT

The inventors acknowledge the support provided by Institute for Research and Medical Consultations (IMRC) of Imam Abdulrahman Bin Faisal University (IAU), Dammam, Kingdom of Saudi Arabia.

STATEMENT REGARDING PRIOR DISCLOSURE BY THE INVENTORS

Aspects of this technology are described in an article "Redox-Mediated Poly(2-acrylamido-2-methyl-1-propanesulfonic acid)/Ammonium Molybdate Hydrogels for Highly Effective Flexible Supercapacitors" published in ChemElectroChem, 2019, 6, 2876-2882, on Apr. 29, 2019, which is incorporated herein by reference in its entirety.

BACKGROUND OF THE INVENTION

Technical Field

The present disclosure also relates to energy storage devices. More specifically, the present disclosure relates to supercapacitors including electrodes and a polymer gel electrolyte. The polymer gel electrolyte contains molybdate (VI) salts dispersed within a hydrogel matrix that involves a polymeric network derived from 2-acrylamido-2-methyl-1-propanesulfonic acid (AMPS) and optionally an additional monomer.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Developing efficient and eco-friendly energy storage devices is an important strategy to alleviate environmental issues caused by excessive use of fossil fuels [JR. Miller, R. A. Outlaw, B. C. Holloway, Graphene double-layer capacitor with ac line-filtering performance, Science (80). 329 (2010) 1637-1639]. Supercapacitors have attracted global attention as energy storage devices because they often have higher power output than conventional devices such as batteries [W. Chen, R. B. Rakhi, L. Hu, X. Xie, Y. Cui, H. N. Alshareef, High-performance nanostructured supercapacitors on a sponge, Nano Lett. 11 (2011) 5165-5172; G. Wang, L. Zhang, J. Zhang, A review of electrode materials for electrochemical supercapacitors, Chem. Soc. Rev. 41 (2012) 797-828; and J. Mu, G. Ma, H. Peng, J. Li, K. Sun, Z. Lei, Facile fabrication of self-assembled polyaniline nanotubes doped with d-tartaric acid for high-performance supercapacitors, J. Power Sources. 242 (2013) 797-802].

The capacitance of a supercapacitor depends on the specific properties of electrode material [G. Wang, L. Zhang, J. Zhang, A review of electrode materials for electrochemical supercapacitors, Chem. Soc. Rev. 41 (2012) 797-828, incorporated herein by reference in its entirety]. Accordingly, research has been focused on the development supercapacitor electrodes using carbon materials [J. W. Lee, J. M. Ko, J. D. Kim, Hydrothermal preparation of nitrogen-doped graphene sheets via hexamethylenetetramine for application as supercapacitor electrodes, Electrochim. Acta. 85 (2012) 459-466; and R. K. Paul, M. Ghazinejad, M. Penchev, J. Lin, M. Ozkan, C. S. Ozkan, Synthesis of a Pillared Graphene Nanostructure: A Counterpart of Three-Dimensional Carbon Architectures, Small. 6 (2010) 2309-2313, each incorporated herein by reference in their entirety], metal oxides [H. Jiang, T. Zhao, C. Li, J. Ma, Hierarchical self-assembly of ultrathin nickel hydroxide nanoflakes for high-performance supercapacitors, J. Mater. Chem. 21 (2011) 3818-3823; and S. Park, S. Kim, Effect of carbon blacks filler addition on electrochemical behaviors of $Co_3O_4$/graphene nanosheets as a supercapacitor electrodes, Electrochim. Acta. 89 (2013) 516-522, each incorporated herein by reference in their entirety], and conducting polymers [H. R. Ghenaatian, M. F. Mousavi, M. S. Rahmanifar, High performance hybrid supercapacitor based on two nanostructured conducting polymers: Self-doped polyaniline and polypyrrole nanofibers, Electrochim. Acta. 78 (2012) 212-222; and L. Nyholm, G. Nyström, A. Mihranyan, M. Strømme, Toward flexible polymer and paper-based energy storage devices, Adv. Mater. 23 (2011) 3751-3769, each incorporated herein by reference in their entirety]. Activated carbon materials are among the most heavily studied materials for commercial supercapacitors because of their electrochemical stability, large surface area, and high conductivity. The electrolyte component of a supercapacitor plays an important role in charge/discharge cycling [A. Burke, Ultracapacitors: why, how, and where is the technology, J. Power Sources. 91 (2000) 37-50, incorporated herein by reference in its entirety]. Polymer electrolytes (PEs) have attracted considerable attention because of their potential applications in energy storage devices. PEs can be used in either solid or gel forms [A. A. Łatoszyńska, P. L. Taberna, P. Simon, W. Wieczorek, Proton conducting gel polymer electrolytes for supercapacitor applications, Electrochim. Acta. 242 (2017) 31-37, incorporated herein by reference in its entirety]. Due to their ion conducting property, PEs can also be used as separators in energy storage devices such as supercapacitors [A. A. Łatoszyńska, G. Z. Żukowska, I. A. Rutkowska, P. L. Taberna, P. Simon, P. J. Kulesza, W. Wieczorek, Non-aqueous gel polymer electrolyte with phosphoric acid ester and its application for quasi solid-state supercapacitors, J. Power Sources. 274 (2015) 1147-1154, incorporated herein by reference in its entirety], and fuel cells [M. Akel, S. Ünügür Çelik, A. Bozkurt, A. Ata, Nano hexagonal boron nitride-Nafion composite membranes for proton exchange membrane fuel cells, Polym. Compos. 37 (2016) 422-428; and A. Aslan, A. Bozkurt, Nanocomposite membranes based on sulfonated polysulfone and sulfated nano-titania/NMPA for proton exchange membrane fuel cells, Solid State Ionics. 255 (2014) 89-95, each incorporated herein by reference in their entirety]. Polymer electrolytes can be classified according to conduction mechanism, including (i) hydrated electrolytes that promote proton conductivity [K. D. Kreuer, Proton conductivity: materials and applications, Chem. Mater. 8 (1996) 610-641, incorporated herein by reference in its entirety], and (ii) anhydrous proton conducting doped polymer electrolytes [A. Bozkurt, W. H. Meyer, Proton conducting blends of poly (4-vinylimidazole) with phosphoric acid, Solid State Ionics. 138 (2001) 259-265; S. Ü. Çelik, A. Aslan, A. Bozkurt, Phosphoric acid-doped poly (1-vinyl-1,2,4-triazole) as water-free proton conducting polymer electrolytes, Solid State Ionics. 179 (2008) 683-688; and Ş. Özden, S. Ü. Çelik, A. Bozkurt, Synthesis and proton conductivity studies of doped azole functional polymer electrolyte membranes, Electrochim. Acta. 55 (2010) 8498-8503, each incorporated herein by reference in their entirety]. In addition, there are promising and practical alternative systems where the conducting species are doped onto a homopolymer or copolymer forming a homogeneous electrolyte.

Recently, redox additives and mediators have been introduced into polymer electrolyte to substantially enhance the capacitance of supercapacitors via redox reactions between the electrode/electrolyte interface [G. Lota, G. Milczarek, The effect of lignosulfonates as electrolyte additives on the electrochemical performance of supercapacitors, Electrochem. Commun. 13 (2011) 470-473; and S. Roldán, C. Blanco, M. Granda, R. Menéndez, R. Santamaria, Towards a Further Generation of High-Energy Carbon-Based Capacitors by Using Redox-Active Electrolytes, Angew. Chemie Int. Ed. 50 (2011) 1699-1701, each incorporated herein by reference in their entirety]. Su et al. have reported an increase in the capacitance of Co—Al layered double hydroxide (LDH) supercapacitor via addition of redox mediator such as 0.1 M $K_3Fe(CN)_6$ and 0.1 M $K_4Fe(CN)_6$ separately to 1 M KOH electrolyte. The electrolyte mixtures each containing 0.1 M $K_3Fe(CN)_6$ and 1 M KOH, and 0.1 M $K_4Fe(CN)_6$ and 1 M KOH have demonstrated large capacitance values of 712 and 317 $F·g^{-1}$ respectively, which are superior than using 1 M KOH solution alone (226 $F·g^{-1}$) [L. -H. Su, X. -G. Zhang, C. -H. Mi, B. Gao, Y. Liu, Improvement of the capacitive performances for Co—Al layered double hydroxide by adding hexacyanoferrate into the electrolyte, Phys. Chem. Chem. Phys. 11 (2009) 2195-2202, incorporated herein by reference in its entirety]. Another research work has reported that upon addition of KI to 1 M $H_2SO_4$ solution, capacitance value of a carbon-based supercapacitor increased from 472 $F·g^{-1}$ (in 1 M $H_2SO_4$) to 912 $F·g^{-1}$ (in KI added 1M $H_2SO_4$) [S. T. Senthilkumar, R. K. Selvan, Y. S. Lee, J. S. Melo, Electric double layer capacitor and its improved specific capacitance using redox additive electrolyte, J. Mater. Chem. A. 1 (2013) 1086-1095, incorporated herein by reference in its entirety]. Similarly, the capacitance of a carbon-based supercapacitor in 2 M KOH increased from 144.1 $F·g^{-1}$ to 605.3 $F·g^{-1}$ via insertion of organic mediator p-phenylenediamine into the electrolyte [J. Wu, H. Yu, L. Fan, G. Luo, J. Lin, M. Huang, A simple and high-effective electrolyte mediated with p-phenylenediamine for supercapacitor, J. Mater. Chem. 22 (2012) 19025-19030, incorporated herein by reference in its entirety].

Despite these recent advances, there is still a need for efficient polymer electrolytes to build supercapacitors with satisfactory cycle life and capacitive performance. In view of the forgoing, one objective of the present disclosure is to provide a gel polymer electrolyte including molybdate(VI) salts dispersed in a 2-acrylamido-2-methyl-1-propanesulfonic acid (AMPS) based hydrogel network. Another objective of the present disclosure is to provide a supercapacitor containing the gel polymer electrolyte and electrodes, as well as electronic devices powered by the supercapacitor.

BRIEF SUMMARY OF THE INVENTION

According to a first aspect, the present disclosure relates to a gel polymer electrolyte that comprises a hydrogel matrix including a polymer formed by a reaction of a monomer system comprising 2-acrylamido-2-methyl-1-propanesulfonic acid (AMPS), and a molybdate(VI) salt dispersed in the hydrogel matrix, wherein the molybdate(VI) salt is present in an amount of 0.1 wt %-20 wt % relative to a total weight of the hydrogel matrix.

In one embodiment, the polymer is a homopolymer formed by a reaction of AMPS.

In one embodiment, the polymer is a copolymer formed by a reaction of a monomer system comprising AMPS and an additional monomer which is at least one selected from the group consisting of an acrylamide monomer, a methacrylamide monomer, an acrylate monomer, a methacrylate monomer, and a vinyl monomer, wherein the acrylamide monomer is not AMPS.

In one embodiment, the molybdate(VI) salt is at least one selected from the group consisting of an ammonium molybdate(VI), a lithium molybdate(VI), a sodium molybdate(VI), and a potassium molybdate(VI).

In a further embodiment, the molybdate(VI) salt is an ammonium molybdate(VI) which is at least one selected from the group consisting of ammonium orthomolybdate $((NH_4)_2MoO_4)$, ammonium heptamolybdate $((NH_4)_6Mo_7O_{24})$, and ammonium dimolybdate $((NH_4)_2Mo_2O_7)$.

In a further embodiment, the molybdate(VI) salt is ammonium orthomolybdate.

In one embodiment, the molybdate(VI) salt is present in an amount of 1 wt %-10 wt % relative to a total weight of the hydrogel matrix.

In one embodiment, the gel polymer electrolyte is substantially amorphous.

According to a second aspect, the present disclosure relates to a supercapacitor. The supercapacitor includes a first electrode and a second electrode, and the polymer gel electrolyte of the first aspect arranged between the first and the second electrodes, wherein the first and the second electrodes each contains a current collector and a conductive layer disposed on the current collector, and wherein the polymer gel electrolyte is in electrical contact with the conductive layers of the first and the second electrodes.

In one embodiment, the polymer gel electrolyte contains 2 wt %-7 wt % of the molybdate(VI) salt relative to a total weight of the hydrogel matrix.

In one embodiment, the conductive layer comprises a conductive carbon or a conductive organic polymer.

In a further embodiment, the conductive layer comprises a conductive carbon which is at least one selected from the group consisting of active carbon, carbon black, single-walled carbon nanotubes, and multi-walled carbon nanotubes.

In a further embodiment, the conductive carbon is active carbon.

In one embodiment, the current collector comprises at least one metal selected from the group consisting of aluminum, gold, silver, copper, platinum, nickel, titanium, and iron.

In a further embodiment, the current collector is aluminum.

In one embodiment, the conductive layer further comprises a binder which is at least one selected from the group consisting of polyvinylidene fluoride, polyvinylidene chloride, and polytetrafluoroethylene.

In one embodiment, the supercapacitor has a specific capacitance ($C_s$) of 360-550 F/g at a current density in a range of 1-10 A/g.

In one embodiment, the supercapacitor has an energy density in a range of 200-280 W·h/kg.

In one embodiment, the supercapacitor has a power density in a range of 2-20 kW/kg.

According to a third aspect, the present disclosure relates to an electronic device comprising the supercapacitor of the first aspect.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
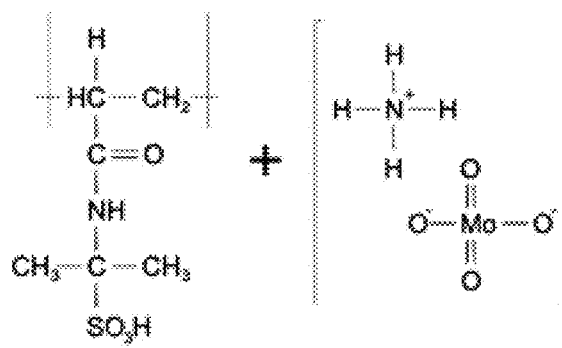
FIG. 1A shows chemical structures of poly(2-acrylamido-2-methyl-1-propanesulfonic acid) (PAMPS), and ammonium molybdate(IV) salt ($(NH_4)_2MoO_4$).
Figure 1B:
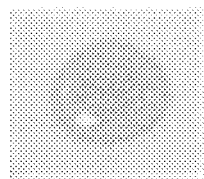
FIG. 1B is a picture of a PAMPS hydrogel (PAMPS).

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, "compound", "salt", and "monomer" are intended to refer to a chemical entity, whether as a solid, liquid, or gas, and whether in a crude mixture or isolated and purified.

The present disclosure includes all hydration states of a given salt or formula, unless otherwise noted. For example, ammonium heptamolybdate(VI) includes anhydrous $(NH_4)_6Mo_7O_{24}$, ammonium heptamolybdate tetrahydrate $(NH_4)_6Mo_7O_{24} \cdot 4H_2O$, and any other hydrated forms or mixtures. Sodium molybdate(VI) includes anhydrous $Na_2MoO_4$, and hydrated forms such as sodium molybdate(VI) dihydrate $Na_2MoO_4 \cdot 2H_2O$.

According to a first aspect, the present disclosure relates to a gel polymer electrolyte that comprises a hydrogel matrix including a polymer comprising reacted units of a monomer system comprising 2-acrylamido-2-methyl-1-propanesulfonic acid (AMPS), and a molybdate(VI) salt dispersed in the hydrogel matrix.

As used herein, "hydrogel" refers to a network of polymer chains, preferably hydrophilic polymer chains, dispersed in water. Hydrogels are absorbent natural or synthetic polymeric networks. Hydrogels also possess a high degree of flexibility due to their significant water content.

AMPS is a hydrophilic acrylic monomer bearing a sulfonic acid group. PolyAMPS (PAMPS) derived from AMPS monomer is a versatile hydrogel with hydrophilic sulfonic acid groups present in the polymeric network. Because of its good proton conductivity under humid condition, PAMPS can be used as a polyelectrolyte for ion conducting [G. Żukowska, N. Chojnacka, W. Wieczorek, Effect of Gel Composition on the Conductivity of Proton-Conducting Gel Polymeric Electrolytes Doped with $H_3PO_4$, Chem. Mater. 12 (2000) 3578-3582, incorporated herein by reference in its entirety]. Recently, cross-linked PAMPS/MMT (i.e. PAMPS/montmorillonite) hydrogels have been synthesized and used with an inorganic additive KOH for electrochemical measurements [J. Wang, X. Yu, C. Wang, K. Xiang, M. Deng, H. Yin, PAMPS/MMT composite hydrogel electrolyte for solid-state supercapacitors, J. Alloys Compd. 709 (2017) 596-601, incorporated herein by reference in its entirety]. Another crosslinked PAMPS/PVA/MMT (i.e. PAMPS/poly (vinyl alcohol)/montmorillonite) hydrogel has been prepared by Wang et al. using an inorganic additive for ionic conductivity. They reported a maximum specific capacitance of 208 F/g [J. Wang, H. Chen, Y. Xiao, X. Yu, X. Li, PAMPS/PVA/MMT Semi-Interpenetrating Polymer Network Hydrogel Electrolyte for Solid-State Supercapacitors, Int. J. Electrochem. Sci. 14 (2019) 1817-1829, incorporated herein by reference in its entirety].

As used herein, monomers are molecules which can undergo polymerization, thereby contributing constitutional repeating units to the structures of a macromolecule or polymer. The process by which monomers combine end to end to form a polymer is referred to herein as "polymerization".

The polymer of the hydrogel matrix may be a homopolymer (i.e. a polymer that contains only a single type of repeating unit). In a preferred embodiment, the polymer is a homopolymer formed by a polymerization reaction of AMPS.

As used herein, a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc.

Alternatively, the polymer of the hydrogel matrix is a copolymer formed by a reaction of a monomer system containing AMPS and an additional monomer.

In one embodiment, the polymer is a copolymer formed by reacting AMPS and an additional monomer which is at least one selected from the group consisting of an acrylamide monomer, a methacylamide monomer, an acrylate monomer, a methacrylate monomer, and a vinyl monomer, wherein the acrylamide monomer is not AMPS.

In addition to AMPS, other acrylamide monomers that may be useful in the present disclosure include, but are not limited to, (3-acrylamidopropyl)trimethylammonium chloride, N-acryloyl-L-valine, N-tert-butylacrylamide, diacetone acrylamide, N,N-dimethylacrylamide, N,N-diethylacrylamide, N-ethylacrylamide, N-hydroxymethylacrylamide, N-hydroxyethylacrylamide, N-[tris(hydroxymethyl)methyl] acrylamide, and mixtures thereof.

Methacrylamide monomers that may be useful in the present disclosure include, but are not limited to, methacrylamide, 2-aminoethylmethacrylamide, N-(3-aminopropyl) methacrylamide, N,N-diethylmethacrylamide, (4-hydroxyphenyl)methacrylamide, 2-hydroxypropyl methacrylamide, N-isopropylmethacrylamide, N-(triphenylmethyl)methacrylamide, N,N-hexamethylenebis(methacrylamide), and mixtures thereof.

Non-limiting examples of applicable acrylate monomers include acrylic acid, 3-sulphopropyl acrylate (SPA), methyl acrylate, ethyl acrylate, propyl acrylate, butyl acrylate, isobutyl acrylate, tert-butyl acrylate, pentyl acrylate, neopentyl acrylate, hexyl acrylate, cyclohexyl acrylate, heptyl acrylate, cyclohexylmethyl acrylate, octyl acrylate, 2-ethylhexyl acrylate, isooctyl acrylate, decyl acrylate, dodecyl acrylate, tetradecyl acrylate, hexadecyl acrylate, octadecyl acrylate, behenyl acrylate, ethyleneglycol diacrylate, neopentylglycol diacrylate, 1,6-hexanediol ethoxylate diacrylate, 1,3-butanediol diacrylate, 1,6-hexanediol diacrylate, 1,4-butanediol diacrylate, di(ethylene glycol) diacrylate, and mixtures thereof.

Methacrylate monomers that may be useful in the present disclosure include, but are not limited to, methacrylic acid, methyl methacrylate (MMA), 2-hydroxyethyl methacrylate (HEMA), isopropyl methacrylate, n-propyl methacrylate, isopropyl methacrylate, n-butyl methacrylate, isobutyl methacrylate, hydroxyethyl methacrylate, hydroxypropyl methacrylate, hydroxybutyl methacrylate, propylene glycol monomethacrylate, isobornyl methacrylate, methoxyethoxyethyl methacrylate, ethoxyethoxyethyl methacrylate, tetrahydrofurfuryl methacrylate, acetoxyethyl methacrylate, phenoxyethylmethacrylate, methacryloyloxyethyl phthalate (MEP), bisphenol A-glycidyl methacrylate (bis-GMA), urethane dimethacrylate (UDMA), triethylene glycol dimethacrylate (TEGDMA), ethoxylated bisphenol A dimethacrylate (bis-EMA), ethyleneglycol dimethacrylate, diethyleneglycol dimethacrylate, 1,3-propanediol dimethacrylate, 1,4-butanediol dimethacrylate, 1,6-hexanediol dimethacrylate, 1,12-dodecanediol dimethacrylate, pyromellitic acid glycerol dimethacrylate (PMGDM), and mixtures thereof.

Exemplary vinyl monomers include, but are not limited to, N-vinylpyrrolidone (NVP), vinyl acetate, vinyl trifluoroacetate, vinyl propionate, vinyl valerate, vinyl neononanoate, vinyl decanoate, vinyl neodecanoate, vinyl stearate, vinyl benzoate, vinyl cinnamate, vinyl 4-tert-butylbenzoate, styrene, vinylbenzyl chloride, 4-vinylbenzoic acid, 2-(trifluoromethyl)styrene, 3-(trifluoromethyl)styrene, 4-(trifluoromethyl)styrene, 4-vinylanisole, 3-methylstyrene, 4-methylstyrene, 2-fluorostyrene, 3-fluorostyrene, 4-fluorostyrene, 2,6-difluorostyrene, 2,3,4,5,6-pentafluorostyrene, 4-tert-butylstyrene, 2,4,6-trimethylstyrene, 3,4-dimethoxystyrene, 4-acetoxystyrene, divinylbenzene, 1,4-bis(4-vinylphenoxy) butane, 1,3,5-triallyl-1,3,5-triazine-2,4,6(1H,3H,5H)-trione, and mixtures thereof.

In a preferred embodiment, the additional monomer is a monomer having one or more hydrophilic groups. Exemplary preferred additional monomers include, but are not limited to, acrylic acid, methacrylic acid, 2-hydroxyethyl methacrylate(HEMA), 3-sulphopropyl acrylate (SPA), 2-sulphoethyl methacylate, and N-vinylpyrrolidone (NVP). When the additional monomer is present in the monomer system, the molar ratio of AMPS to the additional monomer is not viewed as particularly limiting to the preparation of the hydrogel matrix. For example, the monomer system may contain a combination of AMPS and acrylic acid in about 1:5 to about 5:1 molar ratio, about 1:4 to about 4:1 molar ratio, about 1:3 to about 3:1 molar ratio, about 1:2 to about 2:1 molar ratio, about 2:3 to about 3:2 molar ratio, or about 1:1 molar ratio. However, in certain embodiments, the molar ratio of AMPS to acrylic acid is less than 1:5 or greater than 5:1.

The hydrogel matrix of the present disclosure may have a water content of less than 50 wt % relative to a total weight of the hydrogel matrix. Preferably, the hydrogel matrix has a water content of 1-40 wt %, more preferably 3-20 wt %, even more preferably 5-10 wt % relative to a total weight of the hydrogel matrix. While not wishing to be bound by theory, lower water content in the hydrogel matrix may be advantageous because it leads to a polymer gel electrolyte having a higher electrical impedance. Further, a hydrogel with low water content may be resistant to drying out. The water content of a hydrogel may be measured gravimetrically using conventional oven, thermogravimetric analysis (TGA), and/or differential scanning calorimetry (DSC). As used herein, a total weight of the hydrogel matrix refers to a combined weight of polymeric network (e.g. polyAMPS, copolymer of AMPS and the additional monomer) and water.

The hydrogel matrix of the present disclosure may be acidic. In one embodiment, the hydrogel matrix has a pH ranging from 2-6.5, preferably 3-6, preferably 3.5-5.5, preferably 4-5, or about 4.5.

The gel polymer electrolyte of the present disclosure includes a molybdate(VI) salt dispersed within the hydrogel matrix. The molybdate(VI) salts may be bound inside the hydrogel matrix as a result of interaction of molybdate ions with pendent groups present in the hydrogel. For example, the molybdate(VI) salt may interact with the sulfonic groups of the hydrogel matrix through chemical bonding (e.g. metal-ligand complexation, chelating effect, hydrogen bonding, etc.). The molybdate(VI) salts may also interact with the hydrogel via van der Waals forces and/or electrostatic forces.

The molybdate(VI) salts may be embedded in the hydrogel matrix. The hydrogel matrix may encapsulate the molybdate(VI)salts. The molybdate(VI) salts are preferably dispersed in the hydrogel matrix. In an embodiment where the molybdate(VI) salts are well dispersed (i.e., not agglomerated), the molybdate(VI) salts may be evenly dispersed (i.e., a distance between a molybdate(VI) salt and all its neighbors is the same or substantially the same) or randomly dispersed (i.e., the distance between a molybdate(VI) salts and all its neighbors are different). The distance can be said to be substantially the same when the shortest distance is at least 80%, at least 85%, at least 90%, or at least 95% of the average distance and the longest distance is not more than 120%, not more than 110%, or not more than 105% of the average distance. Alternatively, the molybdate(VI) salts are agglomerated. In one embodiment, the molybdate(VI) salts are agglomerated and the agglomerates are in the form of spheres with an average diameter in a range of 5-99 nm, 10-75 nm, or 25-50 nm. Energy-dispersive X-ray spectroscopy, X-ray microanalysis, elemental mapping, transmission electron microscopy (TEM), scanning electron microscopy (SEM), and scanning transmission electron microscopy may be useful techniques for observing the dispersion of the molybdate(VI) salts in the hydrogel matrix.

The molybdate(VI) salt may be at least one selected from the group consisting of an ammonium molybdate(VI), a lithium molybdate(VI) (e.g. $Li_2MoO_4$), a sodium molybdate (VI) (e.g. $Na_2MoO_4$, $Na_2MoO_4 \cdot 2H_2O$, $Na_3P(Mo_3O_{10})_4$), and a potassium molybdate(VI) (e.g. $P_2MoO_4$). In a preferred embodiment, the molybdate(VI) salt is a ammonium molybdate(VI) which is at least one selected from the group consisting of ammonium orthomolybdate (($NH_4)_2MoO_4$), ammonium heptamolybdate (($NH_4)_6Mo_7O_{24}$), and ammonium dimolybdate (($NH_4)_2Mo_2O_7$). In a most preferred embodiment, the molybdate(VI) salt is ammonium orthomolybdate. Other molybdate(VI) salts that can be used in addition to or in lieu of the aforementioned salts include, but are not limited to, zinc molybdate(VI), lead(II) molybdate, bismuth(III) molybdate, iron(II) molybdate, molybdenum (VI) oxide, molybdic(VI) acid, molybdenum(VI) tetrachloride oxide, and bis(acetylacetonato)dioxomolybdenum(VI).

In one or more embodiments, the molybdate(VI) salt is present in the polymer gel electrolyte in an amount of 0.1 wt %-20 wt % relative to a total weight of the hydrogel matrix, preferably 0.25 wt %-18 wt %, preferably 0.5 wt %-16 wt %, preferably 0.75 wt %-14 wt %, preferably 1 wt %-12 wt %, preferably 1.25 wt %-10 wt %, preferably 1.5 wt %-9.5 wt %, preferably 2 wt %-9 wt %, preferably 2.5 wt %-8.5 wt %, preferably 3 wt %-8 wt %, preferably 3.5 wt %-70.5 wt %, preferably 4 wt %-7 wt %, preferably 4.5 wt %-6.5 wt %, preferably 5 wt %-6 wt % relative to the total weight of the hydrogel matrix. In a most preferred embodiment, the polymer gel electrolyte comprises ammonium orthomolybdate dispersed in a hydrogel matrix consisting essentially of PolyAMPS and water, and ammonium orthomolybdate is present in an amount of 1 wt %-10 wt %, preferably 2 wt %-7 wt %, more preferably 3 wt %-6 wt %, even more preferably 4 wt %-5 wt % relative to a total weight of the hydrogel matrix.

It is equally envisaged that other redox active species, including, but not limited to, Co(II) salts, Ni(II) salts, ferrocenes, and quinones (hydroquinone/benzoquinone) may be used in addition to or in lieu of the molybdate(VI) salt.

Exemplary Co(II) salts that may be incorporated into the hydrogel matrix include, but are not limited to, cobalt(II) nitrate, cobalt(II) nitrate hexahydrate, cobalt(II) chloride, cobalt(II) chloride hexahydrate, cobalt(II) acetate, cobalt(II) sulfate, cobalt(II) bromide, cobalt(II) iodide, and mixtures and hydrates thereof.

Exemplary Ni(II) salts that may be incorporated into the hydrogel matrix include, but are not limited to, nickel(II) acetate, nickel(II) acetate tetrahydrate, nickel(II) acetylacetonate, nickel(II) hexafluoroacetylacetonate, nickel(II) octanoate, ammonium nickel(II) sulfate, nickel(II) chloride, nickel(II) bromide, nickel(II) fluoride, nickel(II) iodide, nickel(II) carbonate, nickel(II) hydroxide, nickel(II) nitrate, nickel(II) nitrate hexahydrate, nickel(II) perchlorate, nickel (II) sulfate, nickel(II) sulfamate, and mixtures and hydrates thereof.

Non-limiting examples of ferrocenes include ferrocene (i.e. bis(cyclopentadienyl)iron), ferrocenemethanol, 1-(ferrocenyl)ethanol, 1,1'-ferrocenedimethanol, ferrocenecarboxylic acid, 1,1'-ferrocenedicarboxylic acid, ferroceneacetic acid, 1,1'-dimethylferrocene, ethylferrocene, 1,1'-diethylferrocene, benzoylferrocene, vinylferrocene, and ferrocenylmethyl methacrylate.

Non-limiting examples of quinones include hydroquinone, 1,4-benzoquinone, 1,2-naphthoquinone, 1,4-naphthoquinone, 2-anilino-1,4-naphthoquinone, 1,2-naphthoquinone-4-sulfonic acid, (4'-dimethylaminophenylimino)quinolin-8-one, 4-amino-1,2-naphthoquinone hemihydrate, 9,10-anthraquinone, 9,10-anthraquinone-2,7-disulfonate, and 1,2-dihydroxy-9,10-anthraquinone-3-sulfonic acid.

A polymeric material may be loosely described as crystalline if it contains regions of three-dimensional ordering on atomic (rather than macromolecular) length scales, usually arising from intramolecular folding and/or stacking of adjacent chains. A degree of crystallinity may be expressed in terms of a weight fraction of volume fraction of crystalline material. The crystallinity of polymeric materials may be characterized by their degree of crystallinity, ranging from zero for a completely amorphous (non-crystalline) material to one for a theoretical completely crystalline material. Methods for evaluating the degree of crystallinity include, but are not limited to, differential scanning calorimetry (DSC), X-ray diffraction (XRD), infrared (IR) spectroscopy, and nuclear magnetic resonance (NMR) spectroscopy. The distribution of crystalline and amorphous regions of a polymer may be further visualized with microscopic techniques, such as polarized light microscopy and transmission electron microscopy (TEM). The gel polymer electrolyte described herein may contain both crystalline and amorphous regions. In certain embodiments, the gel polymer electrolyte exhibits a semi-crystalline structure, which has a degree of crystallinity in the range of 0.1-0.7, 0.2-0.5, or 0.3-0.4. In a preferred embodiment, the gel polymer electrolyte is substantially amorphous. While not wishing to be bound by theory, ion transport may occur more readily in the amorphous region than in the crystalline region of the gel polymer electrolyte.

The hydrogel matrix described herein may be commercially available or prepared in-house according to methods known to one of ordinary skill in the art. For example, the hydrogel may be prepared by the following method. The monomer system containing AMPS and optionally the additional monomer at appropriate molar ratio may be mixed with water to form a reaction mixture. In a preferred embodiment, polymerization of the monomer system is performed in the presence of water and a non-polar solvent such as 1,4-dioxane, toluene, benzene, and hexane. Most preferably, polymerization of the monomer system is performed in a mixture of water and 1,4-dioxane in a volume ratio of 1:6 to 2:1, preferably 1:4 to 3:2, preferably 1:3 to 1:1, or about 1:2. A concentration of the monomer system (e.g. AMPS) in the reaction mixture may be in a range of 0.05-5 M, 0.1-2 M, 0.2-1 M, or about 0.47 M.

In one embodiment, the polymerization of the monomer system is a free radical polymerization and the reaction mixture further comprises a free radical initiator. In one embodiment, a free radical initiator is included in the reaction mixture in an amount ranging from about 0.01 mol % to about 5 mol %, about 0.05 mol % to about 4 mol %, about 0.1 mol % to about 3 mol %, about 0.5 mol % to about 2 mol %, or about 1 mol % relative to a total amount of monomer(s) present in the monomer system. Exemplary free-radical initiators include, but not limited to, persulfates, e.g. sodium persulfate, potassium persulfate, and ammonium persulfate, azo compounds, e.g. azobisisobutyronitrile (AIBN), 1,1'-azobis(cyclohexanecarbonitrile) (ABCN), and 4,4'-azobis(4-cyanovaleric acid), hydrogen peroxide, and organic peroxides, e.g. benzoyl peroxide, lauroyl peroxide, methyl ethyl ketone peroxide (MEKP), tert-butyl hydroperoxide, and tert-butyl peroxybenzoate. In a preferred embodiment, the free radical initiator is a persulfate. More preferably, the free radical initiator is potassium persulfate.

In some embodiments, the reaction mixture further comprises a polymerization accelerator (co-initiator) that works in conjunction with the free radical initiator to promote or improve the speed of polymerization reaction. The polymerization accelerator may be added to the reaction mixture in an amount ranging from about 0.01 mol % to about 5 mol %, about 0.1 mol % to about 2.5 mol %, or about 0.25 mol % to about 1 mol % relative to a total amount of monomer(s) present in the monomer system. Exemplary polymerization accelerators include, but are not limited to, tetramethylethylenediamine (TMEDA), N,N-dimethyl-p-toluidine, N,N-bis(2-hydroxyethyl)-p-toluidine, ethyl 4-(dimethylamino)benzoate, dimethylaminoethyl methacrylate, N-(2-cyanoethyl)-N-methyl aniline, 4-(N,N-dimethylamino)phenethyl alcohol, and 4-(N,N-dimethylamino)phenylacetic acid. Preferably, TMEDA is used herein as the polymerization accelerator.

The free radical initiator can be activated by heat and/or an external light source. The monomer system may be reacted (i.e. polymerized) by applying heat with sufficient intensity and/or light at a proper wavelength to the reaction mixture to initiate and propagate free radical polymerization. In a preferred embodiment, the monomer system (e.g. AMPS) is polymerized via heating at a temperature in a range of 40-120° C., preferably 50-90° C., preferably 60-80° C., or about 70° C. for 1-72 hours, 6-60 hours, 12-48 hours, or 24-36 hours with optional agitation. Alternatively, the polymerization may be initiated by applying UV light, for example at a wavelength of 250-380 nm, 280-360 nm, or 310-340 nm, and/or visible light, for example at a wavelength of 380-800 nm, 400-700 nm, 450-600 nm, or 500-550 nm. The agitation may encompass shaking, stirring, rotating, vibrating, sonication and other means of agitating the reaction mixture. For example, the reaction mixture may be agitated throughout the duration of the polymerization reaction by employing a rotary shaker, a magnetic stirrer, a centrifugal mixer, or an overhead stirrer. Alternatively, the reaction mixture may be initially agitated for 5-60 minutes, 10-30 minutes, or about 15 minutes then left to stand (i.e. not agitated). Preferably, the polymerization reaction may be carried out in vacuum, or under an inert gas such as $N_2$, Ar, and He. Most preferably, the polymerization reaction is performed under $N_2$.

In one embodiment, the hydrogel matrix is collected as a solid (e.g. gel) that may be precipitated upon addition of a polar protic solvent (e.g. an alcohol such as ethanol, methanol, isopropanol), separated (filtered off), soaked and washed in water to eliminate impurities, and then filtered. In one embodiment, the hydrogel of the present disclosure has a weight average molecular weight of 1,000-2,000,000 g/mol, preferably 2,000-200,000 g/mol, preferably 3,000-100,000 g/mol, preferably 4,000-50,000 g/mol, preferably 5,000-25,000 g/mol, preferably 6,000-20,000 g/mol, preferably 7,000-15,000 g/mol, preferably 8,000-12,000 g/mol, preferably 9,000-10,000 g/mol.

The gel polymer electrolyte may be prepared by mixing the hydrogel matrix with an aqueous solution of the molybdate(VI) salt (e.g. ammonium orthomolybdate). A concentration of the molybdate(VI) salt in the aqueous solution may be in a range of 0.1-1,000 mM, 1-500 mM, 10-100 mM, 20-75 mM, or 25-50 mM. The molybdate(VI) salt may be mixed with the hydrogel matrix via agitation by an agitator, a vortexer, a rotary shaker, a magnetic stirrer, a centrifugal mixer, an overhead stirrer, or a sonicator, thereby forming the gel polymer electrolyte. Preferably, the molybdate(VI) salt is mixed with the hydrogel matrix via stirring by mechanical stirring, preferably a magnetic stirrer at a speed of 100-1,000 rpm, preferably 200-800 rpm, preferably 300-500 rpm, or about 400 rpm at a temperature in a range of 4-50° C., 10-40° C., 15-30° C., or about 25° C.

The water used herein for the preparation of the hydrogel matrix and the gel polymer electrolyte may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deionized distilled, or reverse osmosis water. Most preferably the water is deionized water.

According to a second aspect, the present disclosure relates to a supercapacitor. The supercapacitor includes a first electrode and a second electrode, and the polymer gel electrolyte of the first aspect in any of its embodiments arranged between the first and the second electrodes, wherein the first and the second electrodes each contains a current collector, and a conductive layer disposed on the current collector, and wherein the polymer gel electrolyte is in electrical contact with the conductive layers of the first and the second electrodes. The polymer gel electrolyte used herein may have similar chemical composition and physical properties as previously specified, and preferably contains 1 wt %-10 wt %, preferably 2 wt %-7 wt %, more preferably 3 wt %-6 wt %, even more preferably 4 wt %-5 wt % of the molybdate(VI) salt (e.g. ammonium orthomolybdate) relative to a total weight of the hydrogel matrix.

As used herein, the terms "first", "second" and the like does not imply any particular order, but they are included to identify individual elements. Further, the use of these terms does not denote any order or importance, but rather these terms are used to distinguish one element from another.

The supercapacitor comprises two electrodes (i.e. the first electrode and the second electrode) parallel or essentially parallel to each other. Each of the electrodes comprises a current collector, and a conductive layer disposed on the current collector. The conductive layer and the current collector may effectively form an electrode structure. The first electrode and the second electrode may be symmetrical with respect to the polymer gel electrolyte, and may have the same structure and characteristics. Hereinafter, only the first electrode will be described in detail. The following description regarding the first electrode may be referred to as description of the second electrode.

The current collector of the first electrode may collect electrons from the conductive layer or may supply electrons to the conductive layer. The current collector may be formed of an electrically conductive material. As defined herein, an electrically conductive material refers to a substance with an electrical resistivity of at most $10^{-8}$ Ω·m, preferably at most $10^{-7}$ Ω·m, more preferably at most $10^{-8}$ Ω·m at a temperature of about 20° C. In one embodiment, the current collector comprises at least one metal selected from the group consisting of aluminum, gold, silver, platinum, titanium, and iron. In a preferred embodiment, the current collector is aluminum. The current collector may be in the form of sheets, ribbons, wires, dots, or some other shape. In one embodiment, the current collector may have an average thickness of 0.1-100 μm, 1-50 μm, 5-25 μm, or about 10 μm.

The conductive layer may comprise a conductive carbon, and/or a conductive organic polymer.

Non-limiting examples of conductive organic polymer include carbon-based polymers such as polyacetylene, poly (p-phenylene vinylene), polyfluorene, polyphenylene, polypyrene, polyazulene, polynaphthalene, nitrogen-containing polymers such as polyaniline, polypyrrole, polyindoles, and polycarbazoles, and sulfur-containing polymers such as polythiophene, poly(3,4-ethylene dioxythiophene), and poly (p-phenylene sulfide).

Non-limiting examples of conductive carbon include active carbon, carbon black (an amorphous material obtainable by the incomplete combustion of heavy petroleum fractions with restricted oxygen access, such as furnace black and Ketjen black), single-walled carbon nanotubes, multi-walled carbon nanotubes, carbon nanorods, carbon fibers, graphene, graphite, expandable graphite, graphene oxide, exfoliated graphite nanoplatelets, thermally reduced graphene oxide, and chemically reduced graphene oxide. In one embodiment, the conductive layer contains a conductive carbon which is at least one selected from the group consisting of active carbon, carbon black, single-walled carbon nanotubes, and multi-walled carbon nanotubes. In a preferred embodiment, the conductive carbon is active carbon, preferably Kuraray® active carbon.

Carbon nanotubes (CNTs) are members of the fullerene family. The name refers to their long, hollow structure with the "walls" formed by one-atom-thick sheets of carbon, called graphene. These sheets are rolled at specific and discrete ("chiral") angles, and the combination of the rolling angle and radius determines the nanotube properties. Individual nanotubes naturally align themselves into "ropes" held together by van der Waals forces and pi-stacking. Nanotubes are categorized as single-walled carbon nanotubes (SWCNTs) and multi-walled carbon nanotubes (MWCNTs). Multi-walled nanotubes consist of multiple rolled layers (concentric tubes) of graphene. Single-walled nanotubes typically have a diameter of close to 1 nm and a tube length of up to many millions of times longer. The structure of a single-walled nanotube can be conceptualized by wrapping a one-atom-thick layer of graphite called graphene into a seamless cylinder.

The active carbon may be in particulate form as powdered active carbon, granular active carbon, extruded active carbon, bead active carbon, but is not limited to such forms of active carbon. In one embodiment, the active carbon used herein has a surface area of 400-2,000 $m^2/g$, preferably 600-1,800 $m^2/g$, preferably 800-1,500 $m^2/g$, preferably 1,000-1,200 $m^2/g$. In certain embodiment, the active carbon used herein has a surface area that is less than 400 $m^2/g$ or greater than 2,000 $m^2/g$.

The carbon black used herein include, but is not limited to, a conductive carbon black having a surface area of 80-200 m²/g, preferably 100-150 m²/g, preferably 120-130 m²/g, a superconductive carbon black having a surface area of 200-600 m²/g, preferably 220-400 m²/g, preferably 250-300 m²/g, an extraconductive carbon black having a surface area of 600-1,200 m²/g, preferably 700-1,000 m²/g, preferably 800-900 m²/g, and an ultraconductive carbon black having a surface area of 1,200-1,500 m²/g, preferably 1,250-1,400 m²/g, preferably 1,300-1,350 m²/g. In a preferred embodiment, the conductive carbon black is TIMCAL C-NERGY® SUPER C65 Carbon Black.

In a preferred embodiment, the conductive carbon comprises active carbon, carbon black, or both. Most preferably, the conductive carbon comprises a mixture of active carbon and carbon black in a weight ratio of 2:1 to 40:1, preferably 4:1 to 20:1, more preferably 6:1 to 10:1, or about 8:1.

The conductive layer may be directly deposited onto the current collector and securely attached to the current collector in any reasonable manner, such as electrostatic interaction and external compressive forces. The conductive layer may have an average thickness of 0.01-50 μm, 0.1-20 μm, 1-10 μm, or 2-5 μm. In one embodiment, the average thickness of the conductive layer is at least 25% less than that of the current collector, preferably at least 35%, preferably at least 50%, preferably at least 75% less than that of the current collector.

The conductive layer may further comprise a binder to help film formation and increase the affinity between the conductive layer and the current collector. In one embodiment, the binder present in the conductive layer is at least one selected from the group consisting of polyvinylidene fluoride (PVDF), polyvinylidene chloride, and polytetrafluoroethylene (PTFE). In a most preferred embodiment, polyvinylidene fluoride is present as the binder in an amount of 1-20 wt %, preferably 5-15 wt %, or about 10 wt % relative to a total weight of the conductive layer.

The polymer gel electrolyte may be in electrical contact with the conductive layers of the first electrode and the second electrode. In one embodiment, a part of the first and the second electrodes may extend away from the polymer gel electrolyte in order to connect with a power source to form part of a circuit. When a voltage is applied to the supercapacitor, cations and anions can be generated and separated within the electrolyte. The separated cations and anions may migrate to the first electrode and the second electrode, respectively, to form an electrical double layer.

The specific capacitance of a supercapacitor is related to a few factors including the specific surface area accessible by the electrolyte, its interfacial double layer capacitance, and the electrode material density. The specific capacitance of a supercapacitor may be calculated from the cyclic voltammetry (CV) voltammograms and/or galvanic charging-discharging curves. In one embodiment, the specific capacitance ($C_s$) of the supercapacitor disclosed herein may be determined based on its galvanic charging-discharging curves using Equation (1) below.

$$C_s = (2I\Delta t)/(w\Delta V) \tag{1}$$

where I, $\Delta t$, w, and $\Delta V$ are discharge current, discharge time, mass of the active material on the electrode, and voltage difference in discharging curve, respectively [M. Dirican, M. Yanilmaz, X. Zhang, Free-standing polyaniline-porous carbon nanofiber electrodes for symmetric and asymmetric supercapacitors, RSC Adv. 4 (2014) 59427-59435, incorporated herein by reference in its entirety].

In one embodiment, the supercapacitor disclosed herein in any of its embodiments has a specific capacitance in a range of 150-550 F/g (farad/gram), 200-500 F/g, 250-450 F/g, or 300-400 F/g at a current density of 0.5-10 A/g (ampere/gram), 1-9 A/g, 2-8 A/g, 3-7 A/g, 4-6 A/g, or 4.5-5.5 A/g. In a preferred embodiment, the polymer gel electrolyte comprises 2 wt %-7 wt %, preferably 3 wt %-6 wt %, more preferably 4 wt %-5 wt % of the molybdate(VI) salt (e.g. ammonium orthomolybdate) relative to a total weight of the hydrogel matrix, and the supercapacitor has a specific capacitance in a range of 360-600 F/g, 375-575 F/g, 410-530 F/g, 440-510 F/g, 460-490 F/g, or 470-480 F/g at a current density of 0.5-10 A/g (ampere/gram), 1-9 A/g, 2-8 A/g, 3-7 A/g, 4-6 A/g, or 4.5-5.5 A/g (see FIG. 5A).

As used herein, "energy density" refers to the amount of energy that can be stored in a supercapacitor per mass of that supercapacitor. Similarly, "power density" measures the amount of power of a supercapacitor that can be delivered to or absorbed from a power source.

In one embodiment, the energy density ($E_d$) of the supercapacitor disclosed herein may be determined based on its galvanic charging-discharging curves using Equation (2) below.

$$E_d = (1/2)C_s V^2 \tag{2}$$

where V is maximum discharging voltage, and $C_s$ is the specific capacitance [S. T. Gunday, E. Cevik, A. Yusuf, A. Bozkurt, Nanocomposites composed of sulfonated polysulfone/hexagonal boron nitride/ionic liquid for supercapacitor applications, J. Energy Storage. 21 (2019) 672-679, incorporated herein by reference in its entirety].

In one embodiment, the supercapacitor disclosed herein in any of its embodiments has an energy density in a range of 70-280 W·h/kg (watt hour/kilogram), 90-260 W·h/kg, 120-240 W·h/kg, 140-220 W·h/kg, or 160-200 W·h/kg. In a preferred embodiment, the polymer gel electrolyte comprises 2 wt %-7 wt %, preferably 3 wt %-6 wt %, more preferably 4 wt %-5 wt % of the molybdate(VI) salt (e.g. ammonium orthomolybdate) relative to a total weight of the hydrogel matrix, and the supercapacitor has an energy density in a range of 200-300 W·h/kg, 210-280 W·h/kg, 220-270 W·h/kg, 230-260 W·h/kg, or 240-250 W·h/kg (see FIG. 5B).

In one embodiment, the power density ($P_d$) of the supercapacitor disclosed herein may be determined based on its galvanic charging-discharging curves using Equation (3) below.

$$P_d = E_d/\Delta t \tag{3}$$

where $E_d$ is the energy density, and $\Delta t$ is the discharge time.

Figure 5A:
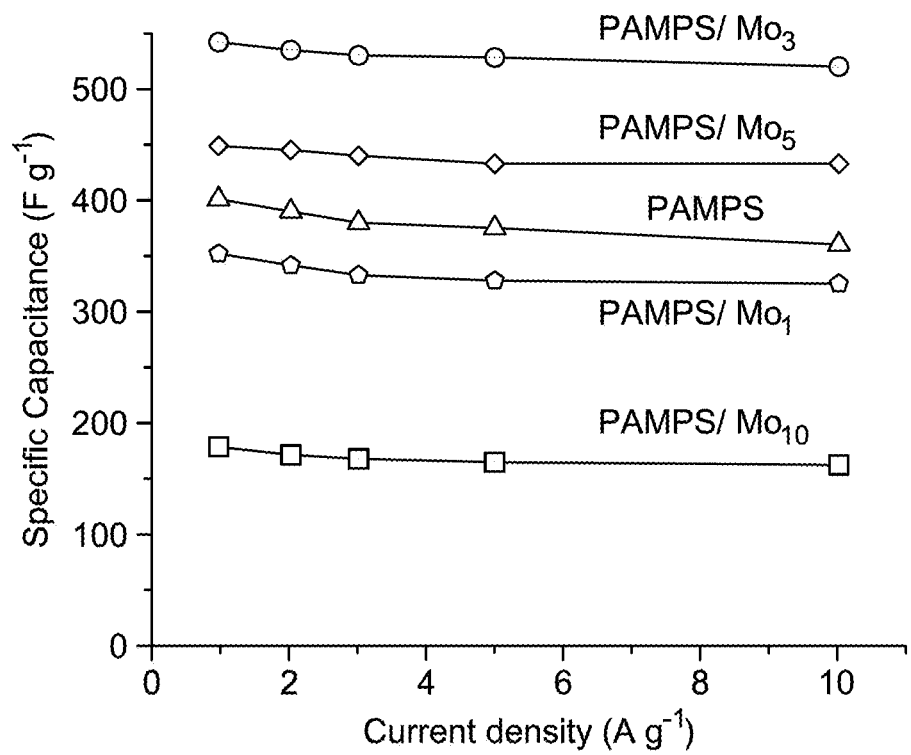
FIG. 5A is a graph showing an overlay of specific capacitances according to current density of supercapacitors each having electrodes, and PAMPS or different gel polymer electrolytes PAMPS/$Mo_1$, PAMPS/$Mo_3$, PAMPS/$Mo_5$, and PAMPS/$Mo_{10}$, respectively.
Figure 5B:
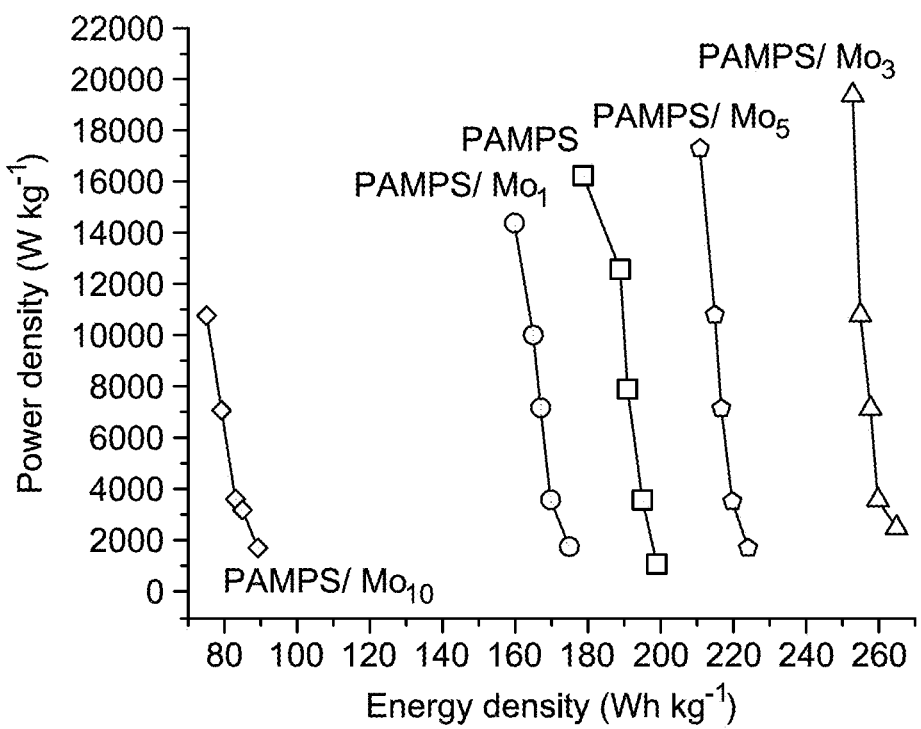
FIG. 5B is a graph showing the relationship of power density and energy density of supercapacitors each having electrodes, and PAMPS or different gel polymer electrolytes PAMPS/$Mo_1$, PAMPS/$Mo_3$, PAMPS/$Mo_5$, and PAMPS/$Mo_{10}$, respectively.

In one embodiment, the supercapacitor has a power density in a range of 1.5-25 kW/kg (kilowatt/kilogram), 2-22 kW/kg, 2.5-20 kW/kg, 3-18 kW/kg, 3.5-17 kW/kg, 4-16 kW/kg, 4.5-15 kW/kg, 5-14 kW/kg, 5.5-13 kW/kg, 6-12 kW/kg, 6.5-11 kW/kg, 7-10 kW/kg, 7.5-9.5 kW/kg, or 8-9 kW/kg (see FIG. 5B).

The resistance of the supercapacitor may be determined by its equivalent series resistance (ESR), charge transfer resistance (Ret), or both. In one embodiment, the supercapacitor disclosed herein has an ESR ranging from 0.1-2 ohm (Ω), preferably 0.2-1.0 Ω, more preferably 0.3-0.5 Ω. ESR may be evaluated using electrochemical impedance spectroscopy (EIS) measurement. In a related embodiment, the supercapacitor has an Ret ranging from 12-40 Ω, preferably 17-34 Ω, more preferably 20-25 Ω. $R_{ct}$ may be measured by cyclic charging-discharging experiment.

The charge/discharge stability of the supercapacitor disclosed herein may be determined by charge-discharge cycling tests. In one embodiment, the charging process is performed at a current of up to 5 mA, for example a current of 1.0-5.0 mA, 1.5-4.5 mA, 2.0-4.0 mA, or 2.5-3.0 mA to reach a voltage of about 1 V, for example 0.7-1.5 V, 0.8-1.4 V, 0.9-1.2 V, or 0.95-1.1 V. In a related embodiment, the discharging process is performed at a current of up to 5 mA, for example a current of a current of 1.0-5.0 mA, 1.5-4.5 mA, 2.0-4.0 mA, or 2.5-3.0 mA to reach a voltage of about 0.1 V, for example 0.05-0.15 V, 0.07-0.13 V, 0.09-0.12 V, or 0.095-0.11 V.

Figure 5C:
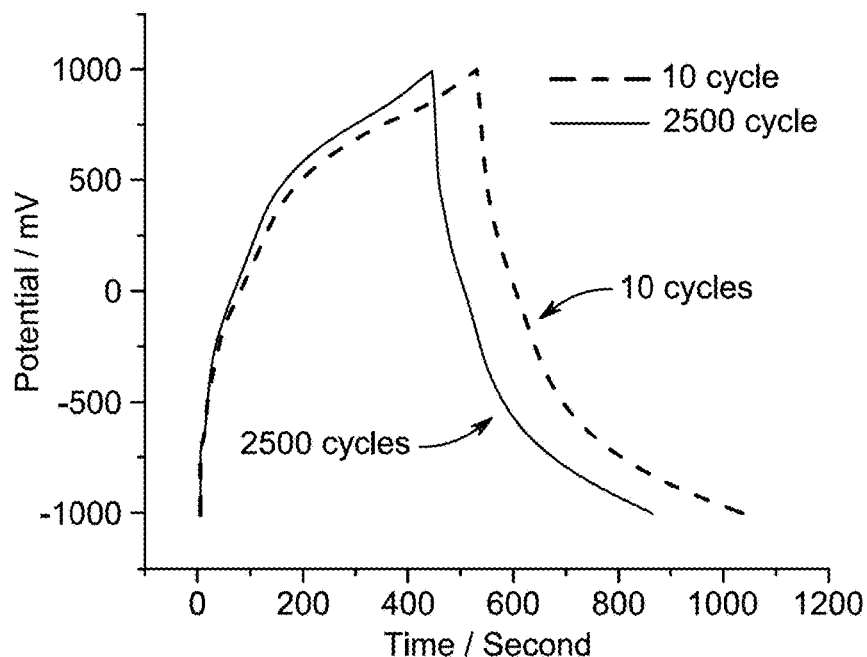
FIG. 5C is an overlay of CD curves of a supercapacitor having electrodes and a gel polymer electrolyte obtained after 10 and 2,500 cycles of charge and discharge (see Example 9).
Figure 5D:
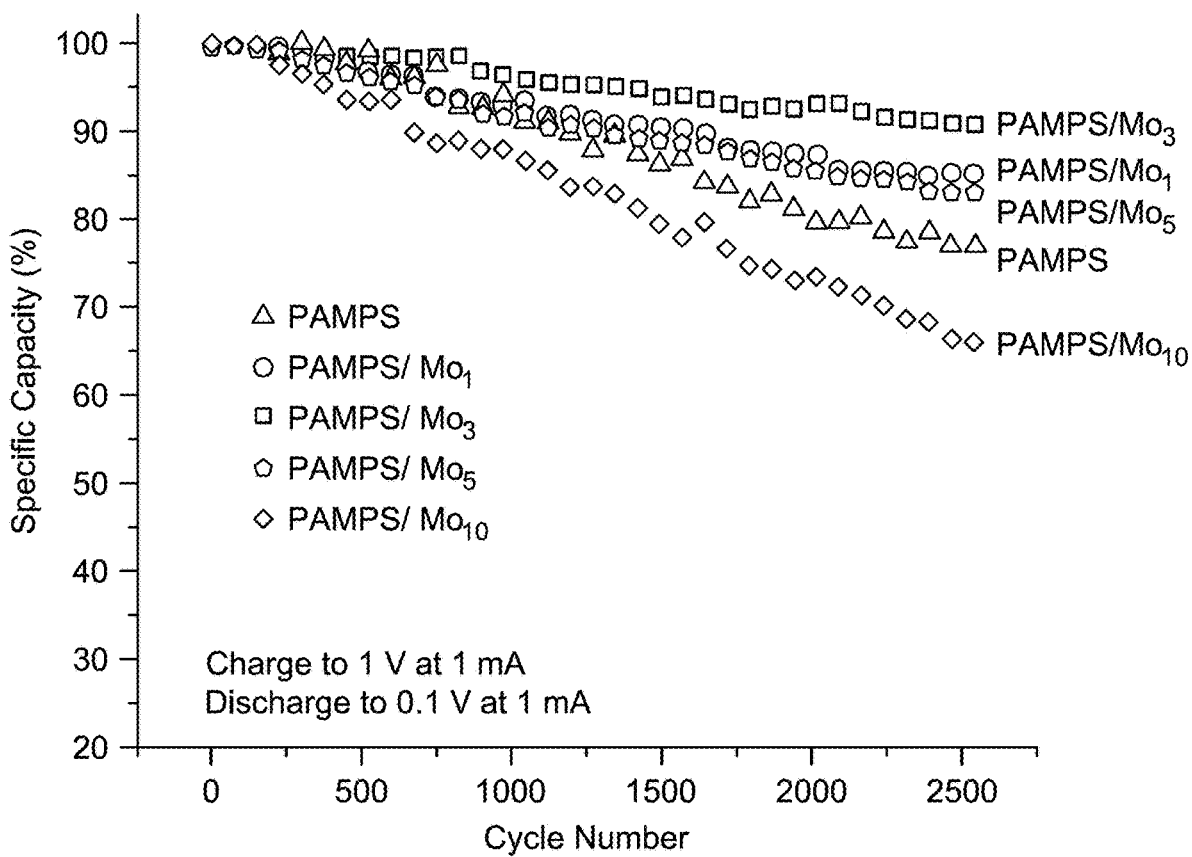
FIG. 5D is a graph showing specific capacity retention percentages according to a number of charge and discharge cycles in supercapacitors each having electrodes, and PAMPS or different gel polymer electrolytes PAMPS/$Mo_1$, PAMPS/$Mo_3$, PAMPS/$Mo_5$, and PAMPS/$Mo_{10}$, respectively.

As shown in FIGS. 5C and 5D, the specific capacitance of the present disclosed supercapacitor maintained nearly constant without a reduction up to about 100 times of charge-discharge cycling, preferably up to about 150 times, more preferably up to about 200 times of charge-discharge cycling. That is, the specific capacitance may maintain a substantially similar capacitance value to the initial level even after about 100, about 150, or about 200 times of charge/discharge cycles.

Gradual performance degradation may occur after about 200 times or more of the cycling. However, when the polymer gel electrolyte comprises 2 wt %-7 wt %, preferably 3 wt %-6 wt %, more preferably 4 wt %-5 wt % of the molybdate(VI) salt (e.g. ammonium orthomolybdate) relative to a total weight of the hydrogel matrix, the supercapacitor retains at least 75% of initial specific capacitance after at least 500 times of charge-discharge cycling, preferably retains 80-99%, more preferably 85-95%, even more preferably 88-92% of initial specific capacitance after 750-3,000 times of charge-discharge cycling, preferably after 1,000-2,500 times of charge-discharge cycling, more preferably after 1,500-2,500 times of charge-discharge cycling, even more preferably after 1,750-2,000 times of charge-discharge cycling.

Figure 5E:
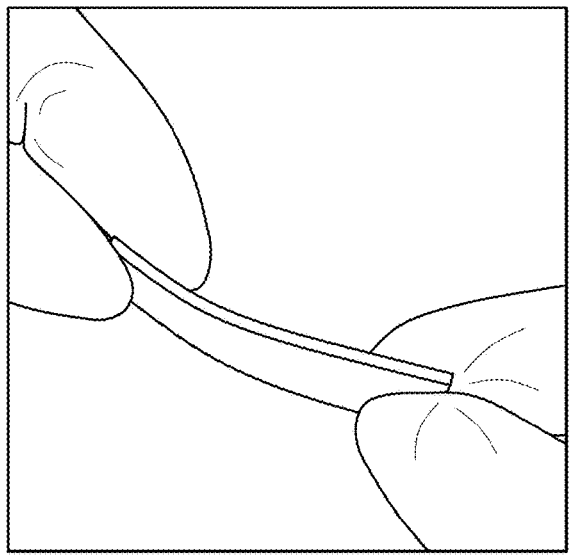
FIG. 5E is a photo showing a supercapacitor having electrodes and a gel polymer electrolyte.
Figure 5F:
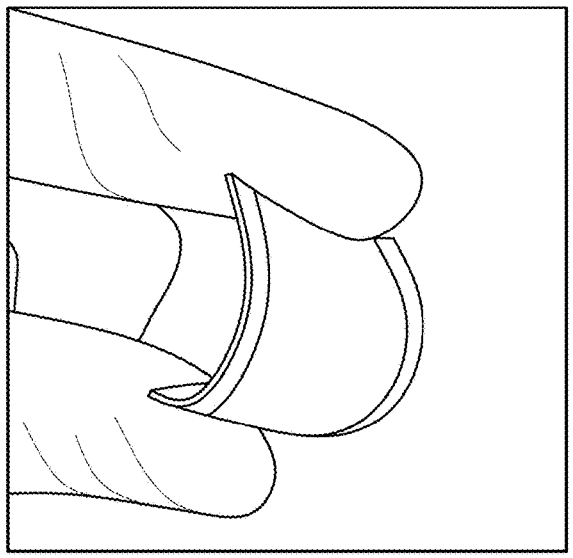
FIG. 5F is a photo showing flexible bending of the supercapacitor of FIG. 5E.
Figure 5G:
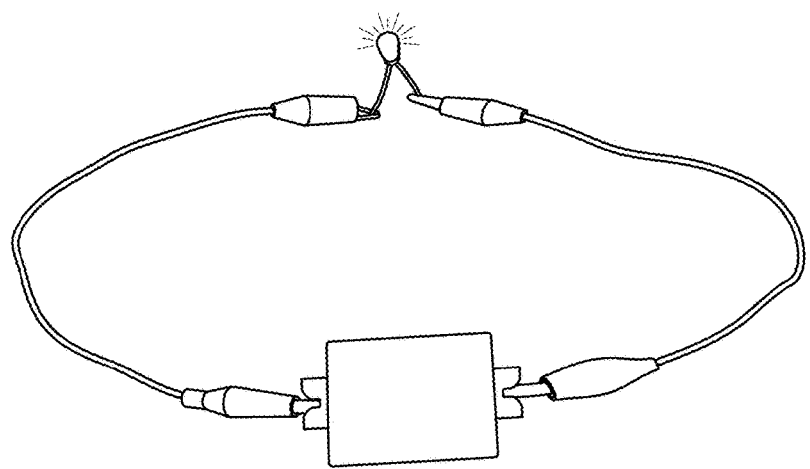
FIG. 5G is a photo showing a LED bulb powdered by the supercapacitor of FIG. 5E.

The supercapacitor of the present disclosure demonstrates mechanical flexibility under bending condition. As shown in FIGS. 5E-G, the supercapacitor maintains physical integrity and exhibits capacitance at a bending angle of 1-180°, preferably 15-150°, preferably 30-120°, preferably 60-90°.

The supercapacitor disclosed herein can operate in a voltage window between ±2 V, preferably ±1.5 V, more preferably ±1 V at a temperature ranging from −40° C. to 80° C., from −10° C. to 60° C., from 4° C. to 40° C., from 15° C. to 35° C., or from 25° C. to 30° C.

According to a third aspect, the present disclosure relates to an electronic device comprising the supercapacitor disclosed herein in any of its embodiments. The supercapacitor may be employed in addition to or in lieu of a conventional battery to store and supply operational power to the electronic device. The power supply provided by the supercapacitor may serve as a regular power source or as a back-up, emergency or auxiliary power source. In one embodiment, the electronic device comprises at least 2, at least 3, at least 4, at least 5, or least 10 supercapacitors of the present disclosure connected in electrical series.

Exemplary electronic devices powered by the supercapacitor include, but are not limited to, consumer electronics such as light-emitting diode (LED) indicators/displays, laptop computers, cellular telephones, personal digital assistants, digital cameras, video cameras, and portable radios, electronic toys, electronic tools, medical devices, and hybrid electric vehicles. Furthermore, the flexible nature of the presently disclosed supercapacitor makes it suitable for applications in textile and apparel industry, wearable electronics, and bio-compatible systems such as implantable medical devices.

The examples below are intended to further illustrate protocols for preparing, assembling, and evaluating the gel polymer electrolyte and the supercapacitor, and uses thereof, and are not intended to limit the scope of the claims.

EXAMPLE 1

Materials

HSV 900 PVDF (polyvinylidene fluoride) binder for Li-ion battery electrodes, 2-Kuraray active carbon (AC) and conductive carbon (CC) (TIMCAL C-NERGY® SUPER C65 Carbon Black) for super-capacitor electrode. Timcal super C65 (conductive additive) was provided by MTI. Acrylamido-2-methyl-1-propanesulfonic acid (AMPS) (>99%), 1,4-dioxane, potassium persulfate ($K_2S_2O_8$), 1-methyl-2-pyrrolidone (NMP), and ethanol were purchased from Merck.

EXAMPLE 2

Sample Preparations

Poly (2-acrylamido-2-methyl-1-propanesulfonic acid) was synthesized via free radical polymerization of 2-acrylamido-2-methyl-1-propanesulfonic acid (AMPS) according to previous work [S. T. Günday, A. Bozkurt, W. H. Meyer, G. Wegner, Effects of different acid functional groups on proton conductivity of polymer-1,2,4-triazole blends, J. Polym. Sci. Part B Polym. Phys. 44 (2006) 3315-3322, incorporated herein by reference in its entirety]. Specifically, 2.9 g of AMPS was dissolved in 30 mL of 1,4-dioxane: deionized water (2:1) solvent system and 1 mol % potassium persulfate was added with respect to monomer. The reaction mixture was placed in a flask and the temperature was adjusted to 70° C. Nitrogen gas was bubbled into the solution followed by stirring for 15 minutes while overall reaction duration was 36 hours. Aqueous solution of the PAMPS polymer was precipitated in ethanol.

Figure 6A:
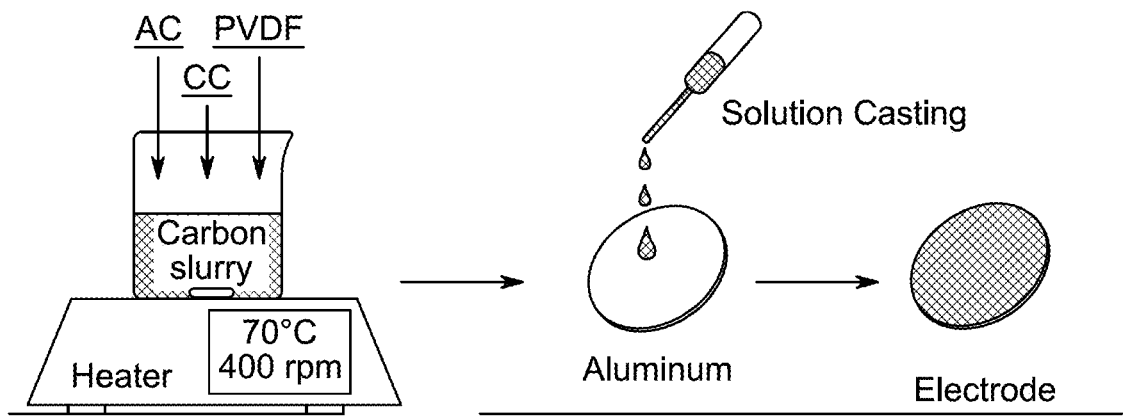
FIG. 6A is a schematic illustration showing the stepwise preparation of an electrode having a conductive layer (active carbon), and a current collector (aluminum).
Figure 6B:
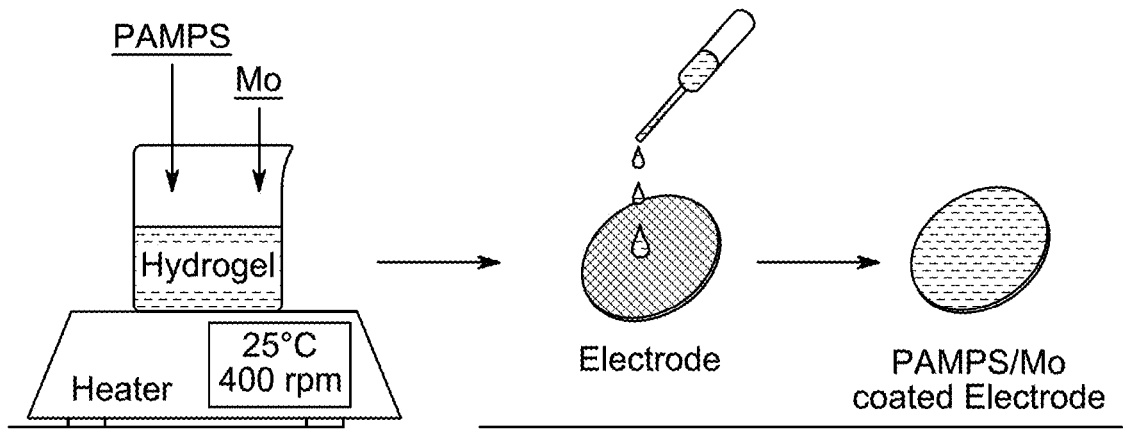
FIG. 6B is a schematic illustration showing the stepwise preparation of a gel polymer electrolyte coated electrode based on the electrode of FIG. 6A.
Figure 7:
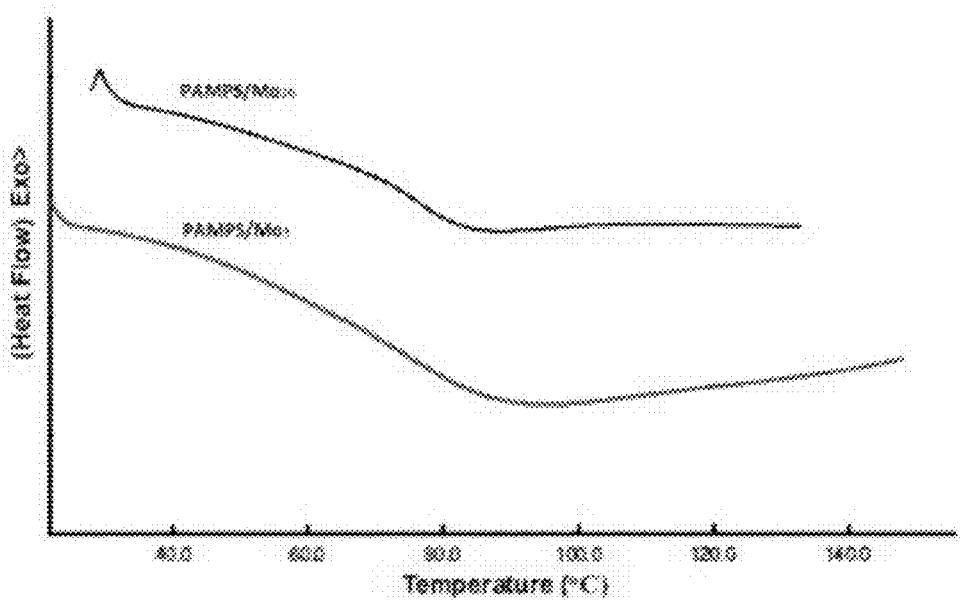
FIG. 7 is an overlay of differential scanning calorimetry (DSC) curves of gel polymer electrolytes PAMPS/$Mo_3$ and PAMPS/$Mo_{10}$.

Redox mediated electrolytes were prepared by doping ammonium molybdate into PAMPS having final concentrations of 1 mM, 20 mM, 50 mM 100 mM in water. Then the hydrogels were abbreviated as PAMPS/$Mo_x$ where x is the percent ratio (w/w) of Mo in PAMPS, ranging from 1 to 10. The supercapacitors were fabricated by drop casting of different PAMPS/Mo polymer electrolyte composites onto the surface of AC electrodes (see FIG. 6B).

EXAMPLE 3

Electrode/Electrolyte Preparation

Several electrodes were prepared for supercapacitor applications using activated carbon as an active material. The carbon electrodes included 10% (w/w) PVDF, 80% (w/w) active carbon (AC), 10% (w/w) conductive carbon (CC) were prepared (see FIG. 6A). After preparation of the carbon electrode, the slurry of the composite materials was cast onto the aluminum current collector (thickness: 10 μm) using an automatic coating machine (MRX Shenzhen Automation Equipment). A standard oven was used to dry these electrodes at 70° C. After heating, ammonium molybdate doped hydrogels (PAMPS/$Mo_x$) were cast onto the previously prepared carbon electrodes.

EXAMPLE 4

Instrumentation and Experimental Variables

Perkin Elmer Fourier-transform infrared (FT-IR) spectrophotometer Spectrum Two™ was used to measure IR spectra of the PAMPS/Mo$_x$ in the range of 400-4000 cm$^{-1}$ with spectral resolution of 4 cm$^{-1}$. Perkin Elmer Pyris-1 was used for thermogravimetric analysis (TGA) to study thermal stabilities of the electrolyte (PAMPS). The sample was heated between 25 and 700° C. under N$_2$ atmosphere with a scan rate of 10° C. min$^{-1}$. Differential Scanning calorimeter (DSC) studies were performed by Hitachi DSC 7000× at a scanning rate of 10° C./min under nitrogen atmosphere. The surface morphology of the prepared Mo doped PAMPS electrolytes were evaluated using scanning electron microscopy (SEM) (FEI, Inspect S50). The samples were coated with gold and scanned at an accelerating voltage of 20 kV. The materials were further analyzed by transmission electron microscopy (TEM) to obtain detailed morphology of the PAMPS/Mo$_x$. For TEM sample preparation, a small amount of the material was dispersed in ethanol by sonication. The sample dispersions were then deposited onto TEM grids. The grids were dried and examined under TEM (FEI, Morgagni 268) at 80 kV.

Supercapacitor devices were fabricated using the configuration: Electrode/Hydrogel-Mo/Electrode. The PAMPS hydrogel was used directly without any additive. Cyclic voltammetry (CV) and galvanostatic charge-discharge (CD) experiments were carried out using GPE for carbon based supercapacitors. The configured devices were placed into the Swagelok cell kit and attached to MTI Battery Analyzer. GCD analysis was conducted at different current densities ranging from 0.5 to 10 A g$^{-1}$ and a cut off voltage was set between 0.1 to 1 V. The supercapacitor cell was then assessed at different scan rates ranging from 10 to 400 mV s$^{-1}$. Cyclic voltammetry (CV) of the devices was investigated using Palmsens Emstat-3 electrochemical analyzer.

EXAMPLE 5

Results and Discussion: FIGS. 1A-D and 7

The host matrix PAMPS was synthesized from the monomer, AMPS, and then doped with Mo in different fractions to prepare redox mediated hydrogels as illustrated in FIG. 1A. The images of the PAMPS hydrogel (PAMPS) and Mo doped PAMPS hydrogels (PAMPS/Mo$_x$) are presented in FIG. 1B. The color of the PAMPS electrolyte changed from yellowish to white, then to bluish with increased concentration of the Mo ions.

Figure 1C:
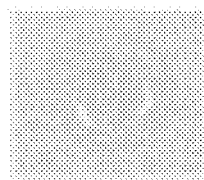
FIG. 1C is a picture of a gel polymer electrolyte containing 1 wt % of ammonium molybdate(IV) salt dispersed in a PAMPS hydrogel (PAMPS/$Mo_1$).

FIG. 1C illustrates an overlay of FT-IR spectra of PAMPS and PAMPS/Mo$_x$ based polymer electrolytes. Previously, FT-IR analysis of ammonium molybdate was performed by a research group. It was found that Mo has several strong absorptions at 620, 880, and 990 cm$^{-1}$ representing stretching of Mo—O, and stretching and bending vibrations of Mo—O—Mo, respectively [S. Sadighi, S. K. M. Targhi, Preparation of Biofuel from Palm Oil Catalyzed by Ammonium Molybdate in Homogeneous Phase, Bull. Chem. React. Eng. Catal. 12 (2017) 49-54, incorporated herein by reference in its entirety]. The absorption peaks appearing at about 1650 cm$^{-1}$ belonged to amide I and 1551 cm$^{-1}$ belonged to amide II of the PAMPS. The strong absorption peak at ~1033 cm$^{-1}$ and broad peak at around 1218 cm$^{-1}$ were attributed to the sulfonic acid groups. After insertion of Mo, a new peak appeared at 918 cm$^{-1}$ due to stretching of Mo—O—Mo units. This peak became clearer for PAMPS/Mo$_5$ and PAMPS/Mo$_{10}$. The broadening of the asymmetric and symmetric O=S=O stretching vibrations at ~1033 cm$^{-1}$ and at 1218 cm$^{-1}$ could be attributed to complexation between Mo and sulfonic acid units of PAMPS.

Figure 1D:
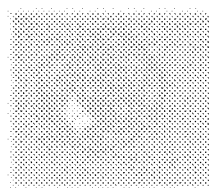
FIG. 1D is a picture of a gel polymer electrolyte containing 5 wt % of ammonium molybdate(IV) salt dispersed in a PAMPS hydrogel (PAMPS/$Mo_5$).
Figure 1E:
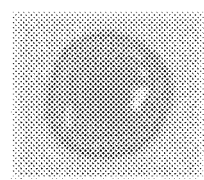
FIG. 1E is a picture of a gel polymer electrolyte containing 10 wt % of ammonium molybdate(IV) salt dispersed in a PAMPS hydrogel (PAMPS/$Mo_{10}$).
Figure 1F:
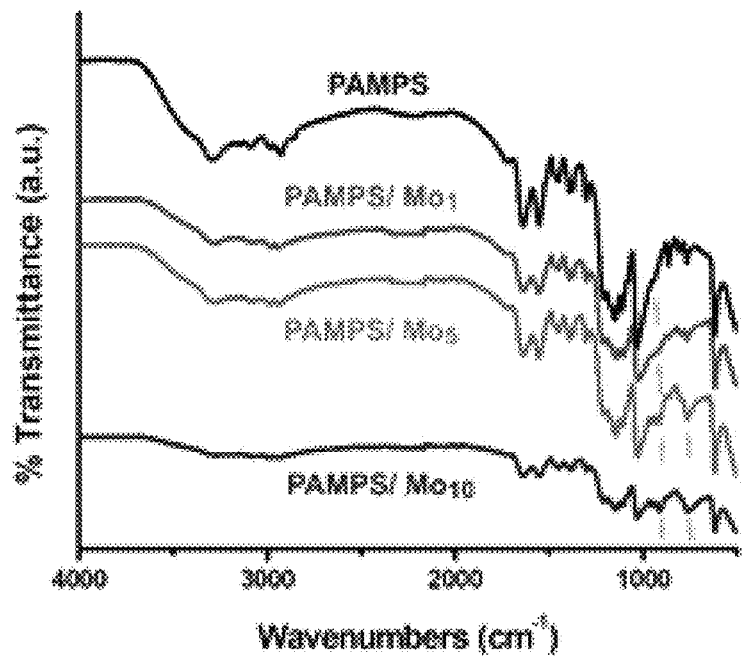
FIG. 1F is an overlay of Fourier transform infrared (FT-IR) spectra of PAMPS, and gel polymer electrolytes PAMPS/$Mo_1$, PAMPS/$Mo_5$, and PAMPS/$Mo_{10}$, respectively.
Figure 1G:
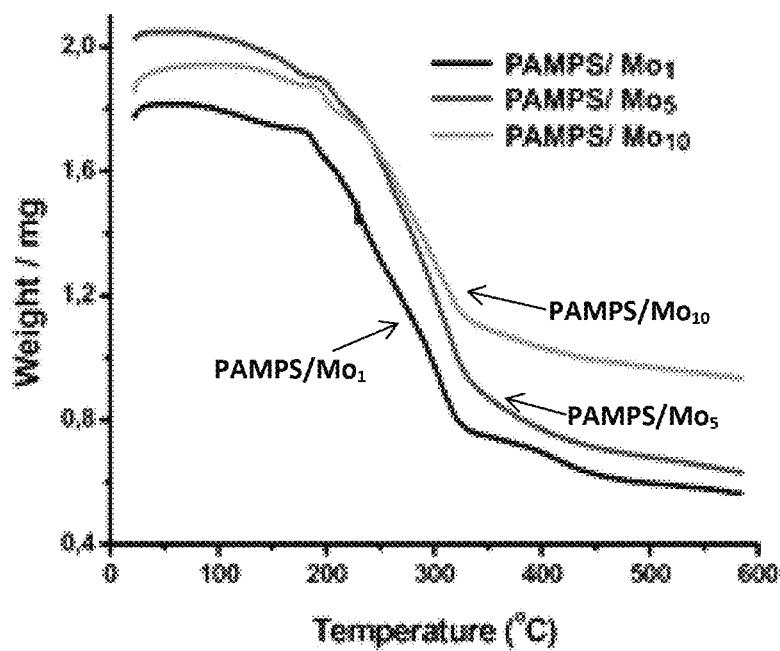
FIG. 1G is an overlay of thermal gravimetric analysis (TGA) of gel polymer electrolytes PAMPS/$Mo_1$, PAMPS/$Mo_5$, and PAMPS/$Mo_{10}$, respectively.

Thermal stability is an important property of polymer electrolytes for their application as supercapacitors. FIG. 1D shows the TGA curve of the PAMPS electrolyte, which demonstrates two steps of weight change. The first domain ranged up to 150° C. illustrated 3-4% weight loss. This loss could be attributed to evaporation of absorbed humidity. A sharp weight change was observed at the second domain at above 170° C., which was due to degradation of the polymer [S. T. Gunday, A. Bozkurt, W. H. Meyer, G. Wegner, Effects of different acid functional groups on proton conductivity of polymer-1,2,4-triazole blends, J. Polym. Sci. Part B Polym. Phys. 44 (2006) 3315-3322, incorporated herein by reference in its entirety]. The degradation of the redox mediated electrolytes: PAMPS/Mo$_1$, PAMPS/Mo$_5$ and PAMPS/Mo$_{10}$ started at 179° C., 188° C. and 196° C., respectively. Clearly, thermal stability of the electrolytes was enhanced with increasing Mo content.

Thermal properties of the redox mediated polymer electrolytes were further investigated by DSC method. The second heating curves of the samples were evaluated and illustrated in FIG. 7. The glass transition temperatures of the dry PAMPS/Mo$_3$ and PAMPS/Mo$_{10}$ were determined to be 71° C. and 80° C., respectively. The shift in glass transition temperature by increasing Mo content can be resulted from complex formation between the host polymer PAMPS and the mediator (Mo) that restricted polymer segmental dynamics.

EXAMPLE 6

Results and Discussion: FIGS. 2A-C and 8A-B

Figure 2A:
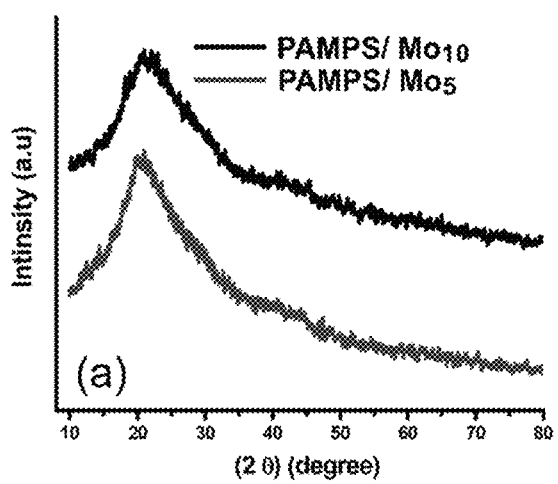
FIG. 2A is an overlay of X-ray diffraction (XRD) patterns of gel polymer electrolytes PAMPS/$Mo_5$ and PAMPS/$Mo_{10}$, respectively.

FIG. 2A shows an overlay of XRD plots of PAMPS/Mo$_x$. The spectra demonstrate characteristic amorphous nature of both PAMPS/Mo$_5$ and PAMPS/Mo$_{10}$ composites. This indicates that due to the complex formation between Mo and PAMPS, there was no crystal domains embedded in the polymer matrix.

Figure 2B:
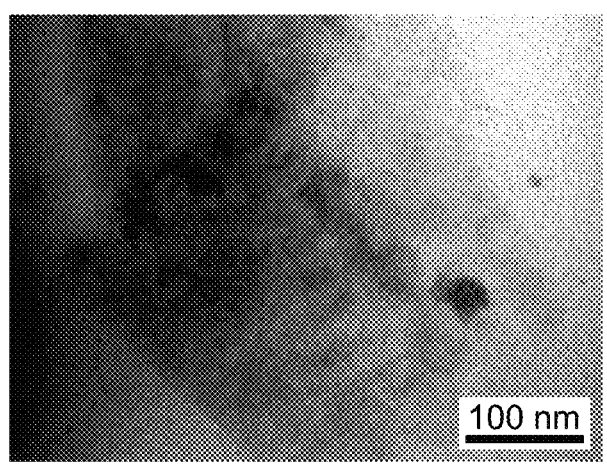
FIG. 2B is a transmission electron microscopy (TEM) image (scale bar: 100 nm) of gel polymer electrolytes PAMPS/$Mo_5$.
Figure 2C:
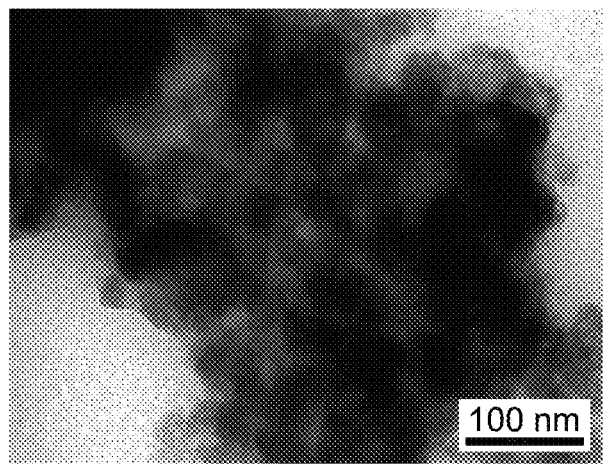
FIG. 2C is a TEM image (scale bar: 100 nm) of gel polymer electrolytes PAMPS/$Mo_{10}$.
Figure 8A:
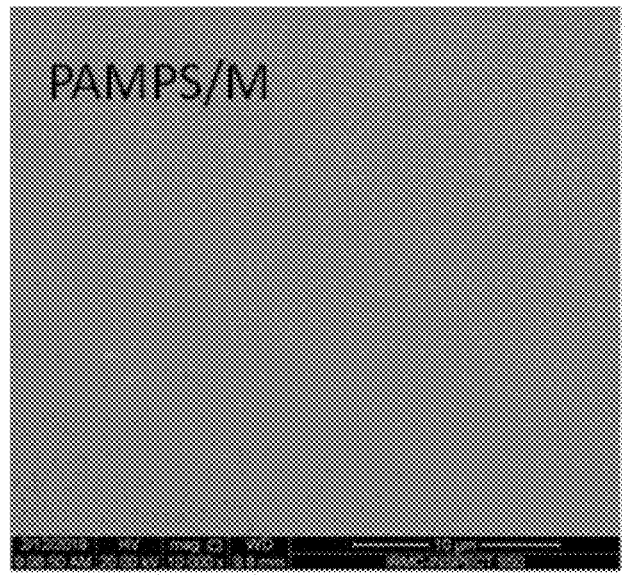
FIG. 8A is a scanning electron microscope (SEM) image (scale bar: 10 μm) of gel polymer electrolyte PAMPS/$Mo_5$.
Figure 8B:
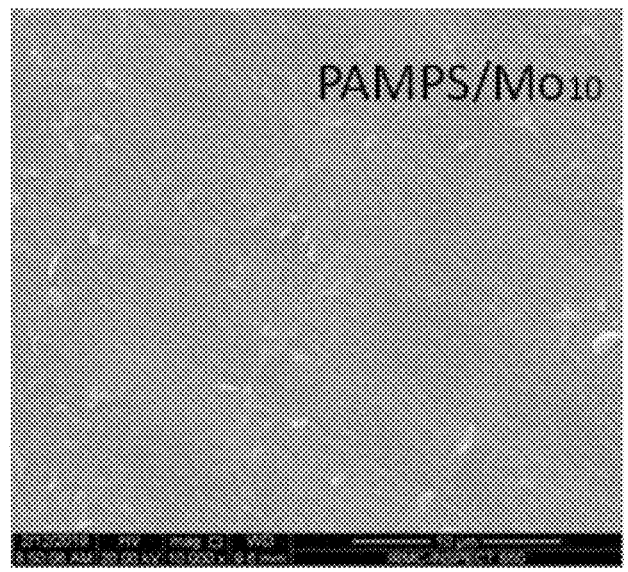
FIG. 8B is a SEM image (scale bar: 10 μm) of gel polymer electrolyte PAMPS/$Mo_{10}$.

TEM pictures of two electrolytes PAMPS/Mo$_5$ and PAMPS/Mo$_{10}$ are depicted in FIGS. 2B and 2C, respectively. Almost no morphological change was observed in PAMPS/Mo$_5$, which indicated homogeneous dispersion of Mo in the polymer. Nevertheless, PAMPS/Mo$_{10}$ which included a higher concentration of Mo exhibited almost spherical shape with an average diameter of less than 100 nm (FIG. 2C). This behavior could be resulted from complexation and nanoscale aggregation of Mo in the dried polymer composite. These findings are in agreement with the SEM photographs where surface roughness of PAMPS/Mo$_{10}$ was greater that of PAMPS/Mo$_5$ (FIGS. 8A-B).

EXAMPLE 7

Results and Discussion: FIGS. 3A-E

Figure 3A:
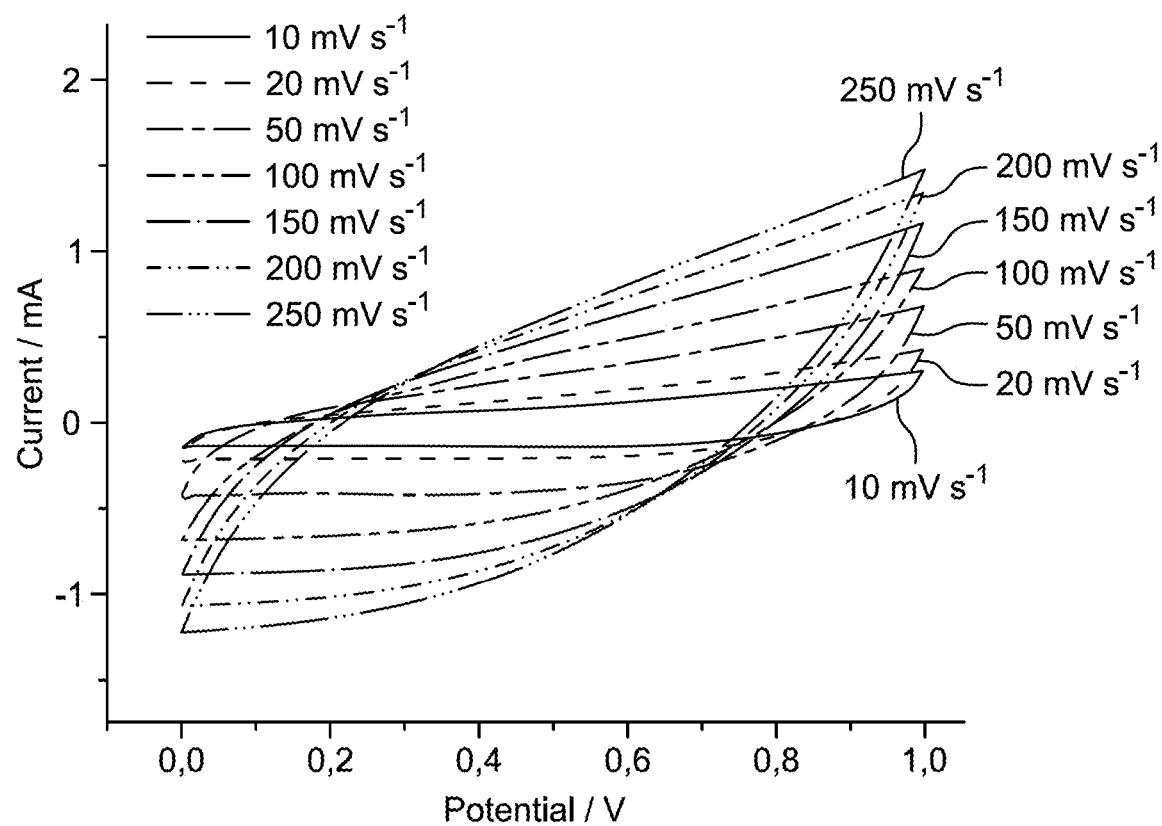
FIG. 3A is a graph showing an overlay of cyclic voltammetry (CV) voltammograms of a supercapacitor having a gel polymer electrolyte and electrodes (see Example 4) obtained at different scan rates ranging from 10 to 250 mV/s.

Cyclic voltammetry of the PAMPS based supercapacitors was performed at different scan rates ranging from 10 mV s$^{-1}$ to 250 mV s$^{-1}$ as shown in FIG. 3A. The curves were relatively rectangular in shape, indicating an ideal capacitive behavior. There was no noticeable change in the forward and reverse scans, indicating the stability of the device even at higher scan rates.

Figure 3B:
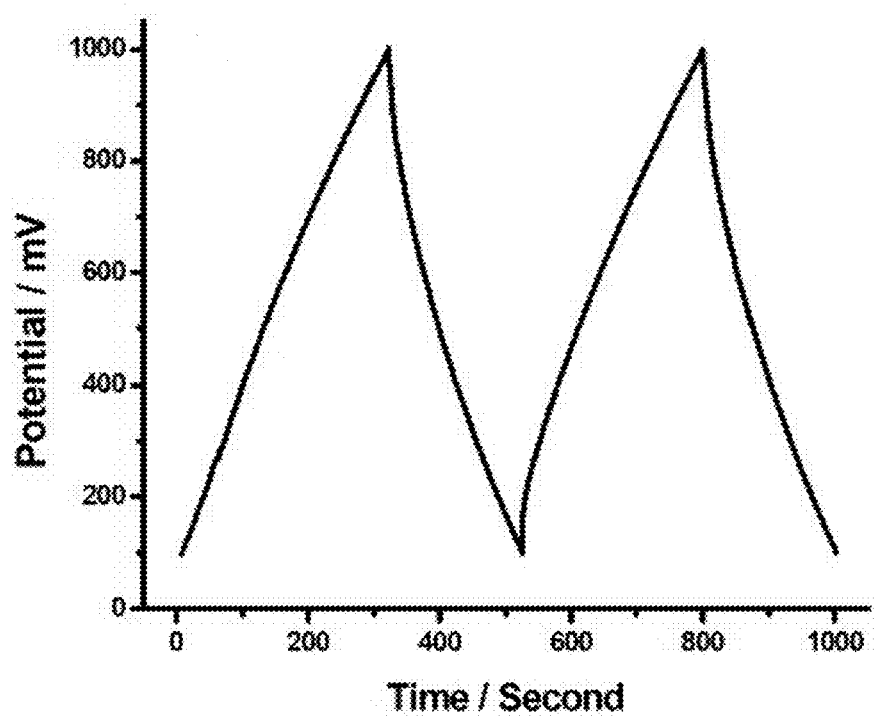
FIG. 3B shows charge-discharge (CD) curves of a supercapacitor having a gel polymer electrolyte and electrodes.
Figure 3C:
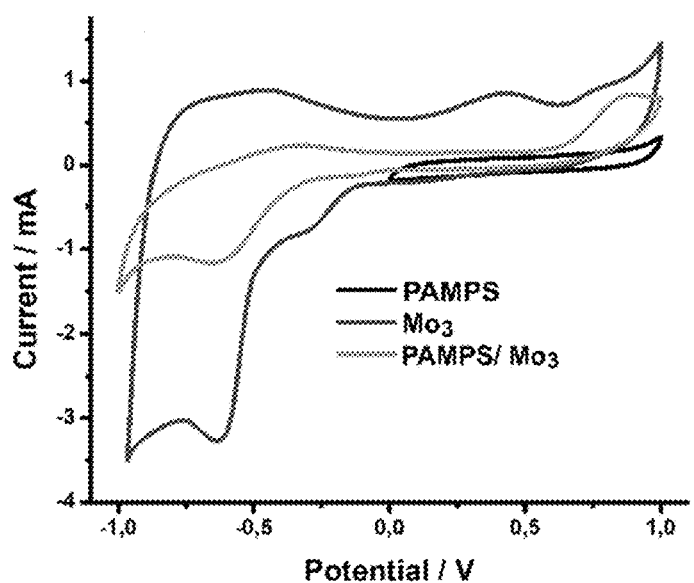
FIG. 3C is an overlay of CV voltammograms of PAMPS hydrogel (PAMPS), ammonium molybdate(IV) salt ($Mo_3$), and gel polymer electrolyte PAMPS/$Mo_{10}$, respectively, obtained at a scan rate of 10 mV/s.

The CD experiments of the symmetric Electrode/PAMPS/Electrode supercapacitor were performed at different applied current densities. FIG. 3B shows typical CD curves obtained from the supercapacitor tested under conditions of charge to 1 V at 1 mA then discharge to 0.1 V at 1 mA with a mass of 1 mg of active electrode material. The CD curves indicated that the PAMPS based supercapacitor had a linear CD characteristic at 1 mA that was consistent with the CV results.

Cyclic voltammetry (CV) studies of redox active molybdate ions doped PAMPS hydrogels were evaluated in a solution containing 0.01 M HCl and 0.1 M KCl. The CV of the PAMPS hydrogen coated electrode was represented in the voltammogram of FIG. 3C obtained at a scan rate of 10 mV s$^{-1}$. Importantly, there was no oxidation or reduction process observed which was attributed a stable structure of the hydrogel. The voltammogram in FIG. 3C also showed the CV of pristine ammonium molybdate obtained at a scan rate of 10 mV s$^{-1}$ at the potential range of −1 V to +1 V, in the same solution. Two strong redox pairs were obtained, which were very well-defined in the CV voltammogram. Redox pairs Mo(VI)/Mo(IV) and Mo(VI)/Mo(V) were observed as the corresponding peaks centered at −0.1 V/−0.4 V and 0.5 V/0.1 V.

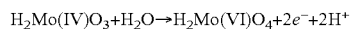

$H_2Mo(IV)O_3 + H_2O \rightarrow H_2Mo(VI)O_4 + 2e^- + 2H^+$

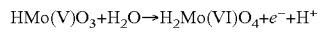

$HMo(V)O_3 + H_2O \rightarrow H_2Mo(VI)O_4 + e^- + H^+$ $MoO_4$ species tend to have a polymeric ion structure ($H_2MoO_4$) at the oxidation level of +VI in acidic media [K. Sun, E. Feng, H. Peng, G. Ma, Y. Wu, H. Wang, Z. Lei, A simple and high-performance supercapacitor based on nitrogen-doped porous carbon in redox-mediated sodium molybdate electrolyte, Electrochim. Acta. 158 (2015) 361-367, incorporated herein by reference in its entirety]. The PAMPS hydrogel is acidic due to its $HSO_3$ structure, which creates an acidic environment that oxidizes the molybdate and forms $H_2MoO_4$.

Figure 3D:
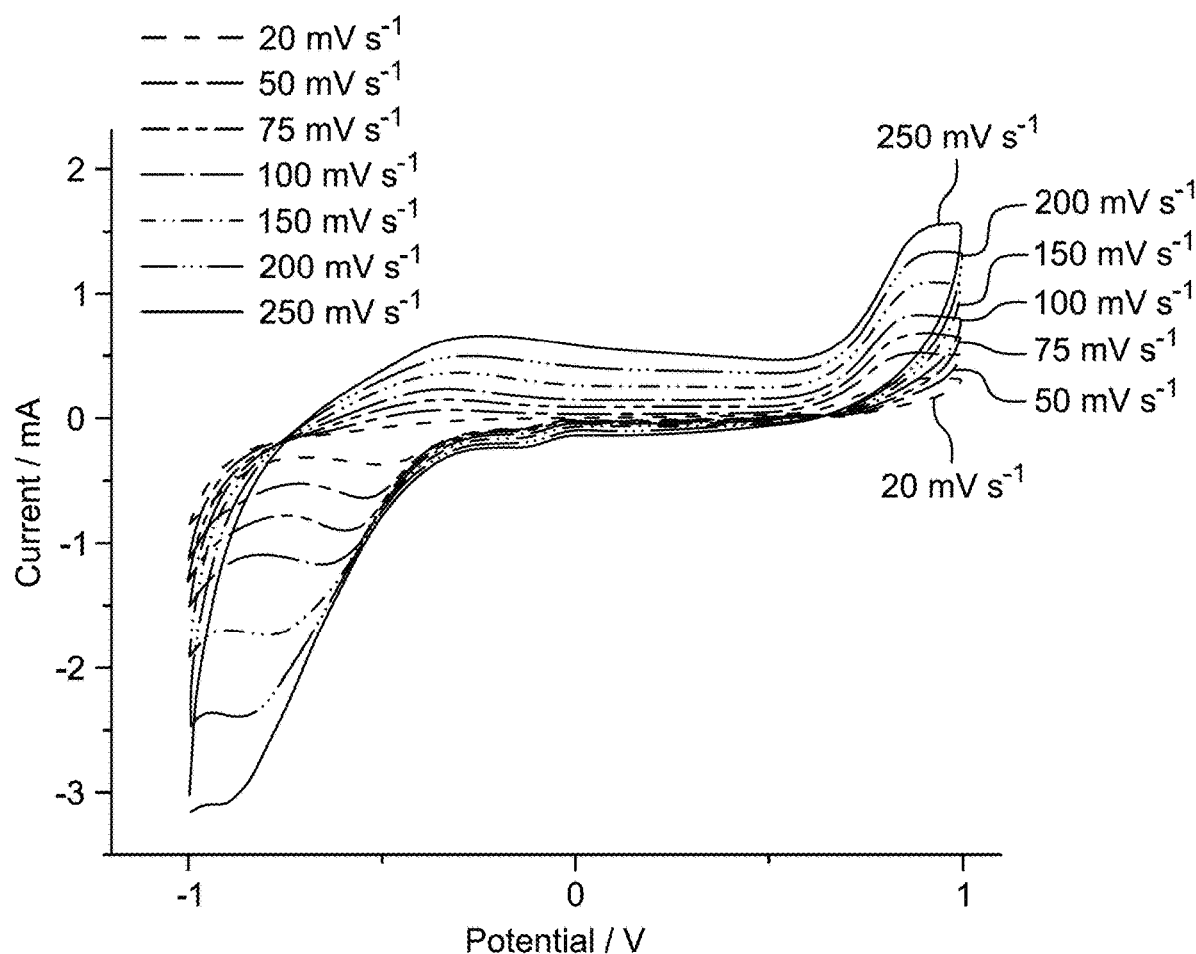
FIG. 3D is an overlay of CV voltammograms of gel polymer electrolyte obtained at different scan rates ranging from 20 to 250 mV/s.

An increase in ion mobility in the hydrogel has been observed in terms of current density, as the scan rate increased from 20 to 250 mV s$^{-1}$ (FIG. 3D). A nice reversibility of the peaks was observed during the forward and reverse scans. Peak intensities were also high because of the charge transfer capability of the hydrogel. Accordingly, it was concluded that PAMPS/Mo hydrogels were capable of both slow and fast ion transfer behavior. Moreover, the redox active metal doped hydrogel retained its initial behavior, even if the scan rate was increased to up to 250 mV s$^{-1}$. This indicates the excellent charge performance as well as high electrochemical stability of the electrolyte.

Figure 3E:
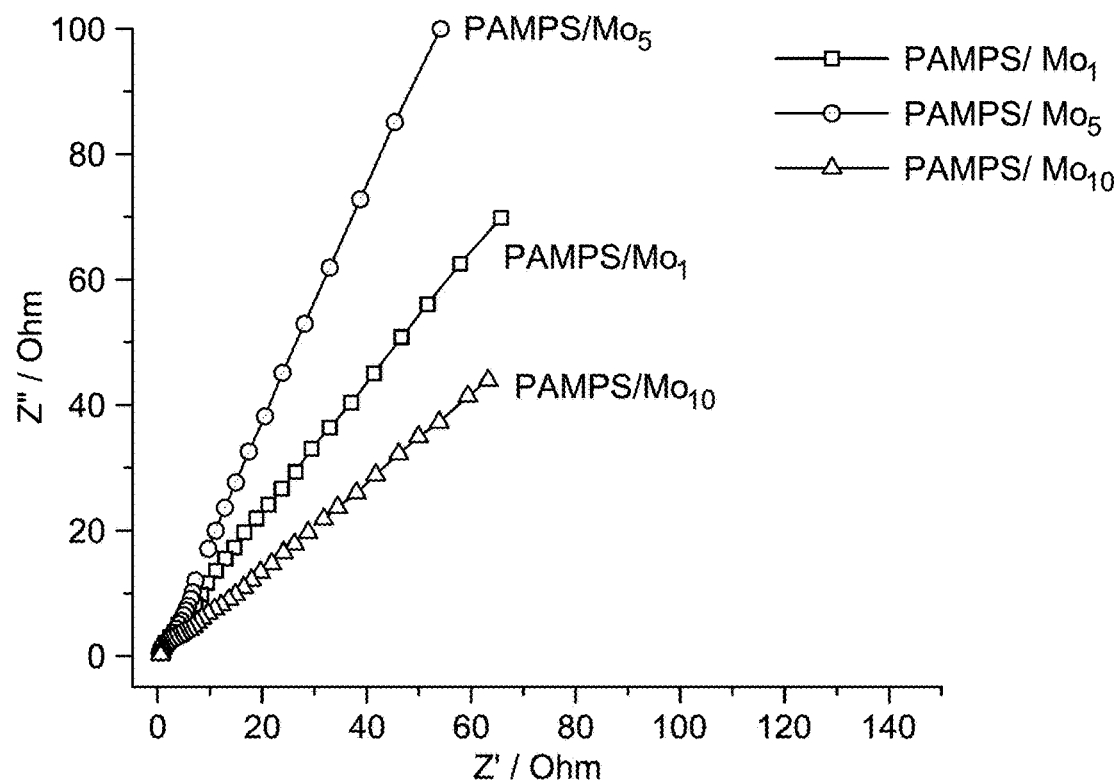
FIG. 3E is an overlay of Niquist plots obtained from electrochemical impedance spectroscopy (EIS) measurement of gel polymer electrolytes PAMPS/$Mo_1$, PAMPS/$Mo_3$, and PAMPS/$Mo_{10}$, respectively.
Figure 3F:
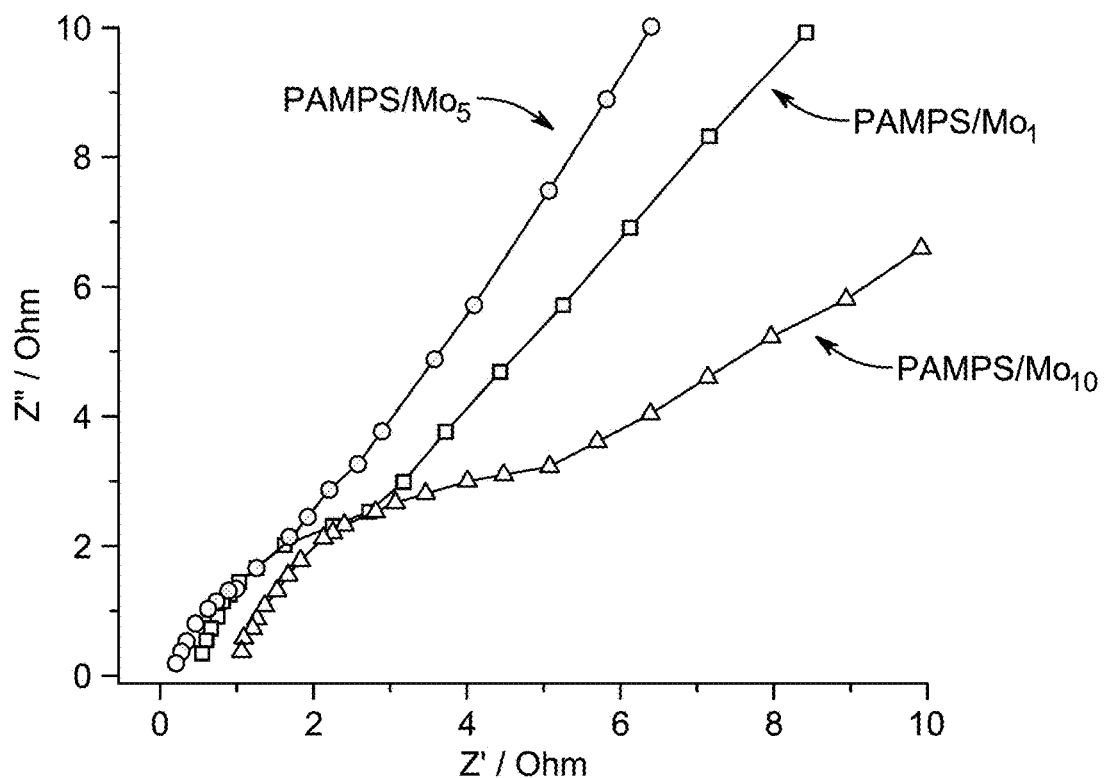
FIG. 3F is an expanded view of Niquist plots of FIG. 3E at high frequency region.

EIS measurements were performed for the PAMPS/Mo$_x$ (x=1, 3, 10) electrolytes and the corresponding Nyquist plots are shown in FIGS. 3E-F. The resistance values of electrolytes PAMPS/Mo$_1$, PAMPS/Mo$_3$, and PAMPS/Mo$_{10}$ are equivalent to the equivalent series resistance (ESR) at the X-axis intersection [M. Q. Yu, Y. H. Li, S. Yang, P. F. Liu, L. F. Pan, L. Zhang, H. G. Yang, Mn3O4 nano-octahedrons on Ni foam as an efficient three-dimensional oxygen evolution electrocatalyst, J. Mater. Chem. A. 3 (2015) 14101-14104, incorporated herein by reference in its entirety], which was found to be 0.52, 0.28, and 1.02 Ohm, respectively. The line which makes an angle of 450 with the real axis in the low frequency region, shows the Warburg resistance (W) [N. Kurra, M. K. Hota, H. N. Alshareef, Conducting polymer micro-supercapacitors for flexible energy storage and Ac line-filtering, Nano Energy. 13 (2015) 500-508, incorporated herein by reference in its entirety] and diffusion of the ions in the electrolyte into the pores within the electrode surface. Warburg line of the PAMPS/Mo$_3$ cast electrodes indicates that the composite system allows ion diffusion in the electrode pores. The diameter of the semicircle in the high frequency region indicates the resistance magnitude (Rct) measured from the electrode [M. Liu, L. Gan, W. Xiong, Z. Xu, D. Zhu, L. Chen, Development of MnO$_2$/porous carbon microspheres with a partially graphitic structure for high performance supercapacitor electrodes, J. Mater. Chem. A. 2 (2014) 2555-2562, incorporated herein by reference in its entirety]. The Rct values obtained from the symmetrical PAMPS/Mo$_x$ (x=1, 3, 10) supercapacitors were 17.25, 23.50, and 33.85 ohm, respectively. High Mo concentrations appeared to increase the internal resistance (Rct) of the electrode. This can be explained by the complexation of Mo ions with the polymer resulting in more agglomeration, as confirmed by TEM results. This may limit the distribution of ions to the electrode surface. The lowest internal resistance value was observed for the electrodes containing PAMPS/Mo$_1$ and PAMPS/Mo$_3$, which indicated that faster ion diffusion rate of these electrodes offered more suitable ion channels and/or shorter path for ion movement compared to those having higher concentration of Mo.

EXAMPLE 8

Results and Discussion: FIGS. 4A-F

Figure 4A:
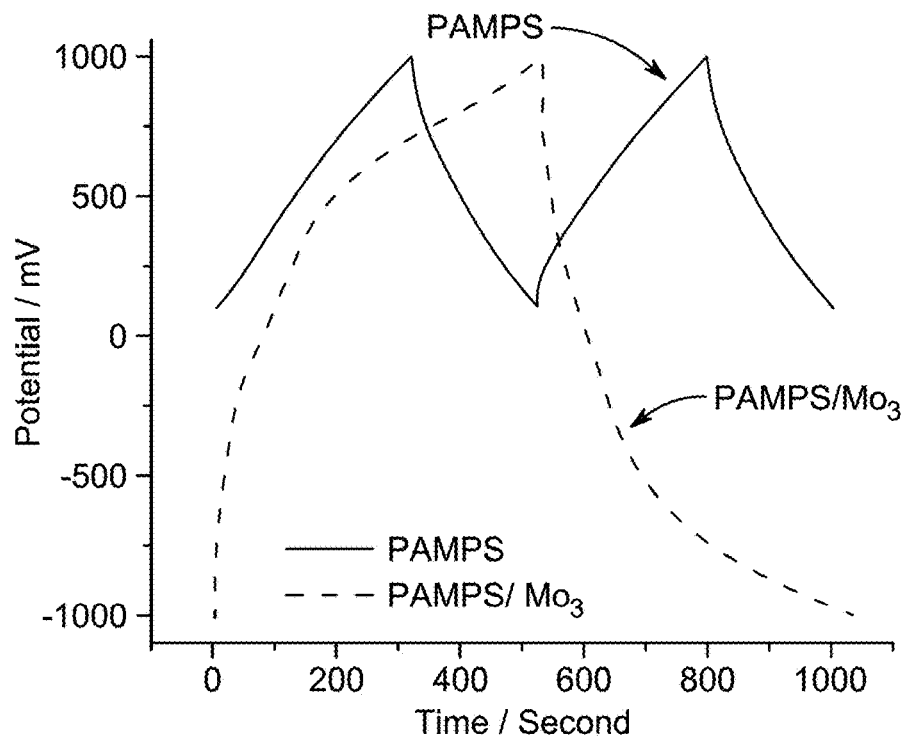
FIG. 4A shows CD curves of supercapacitors each having electrodes and gel polymer electrolyte PAMPS/$Mo_3$ or PAMPS hydrogel (see Example 8).
Figure 4B:
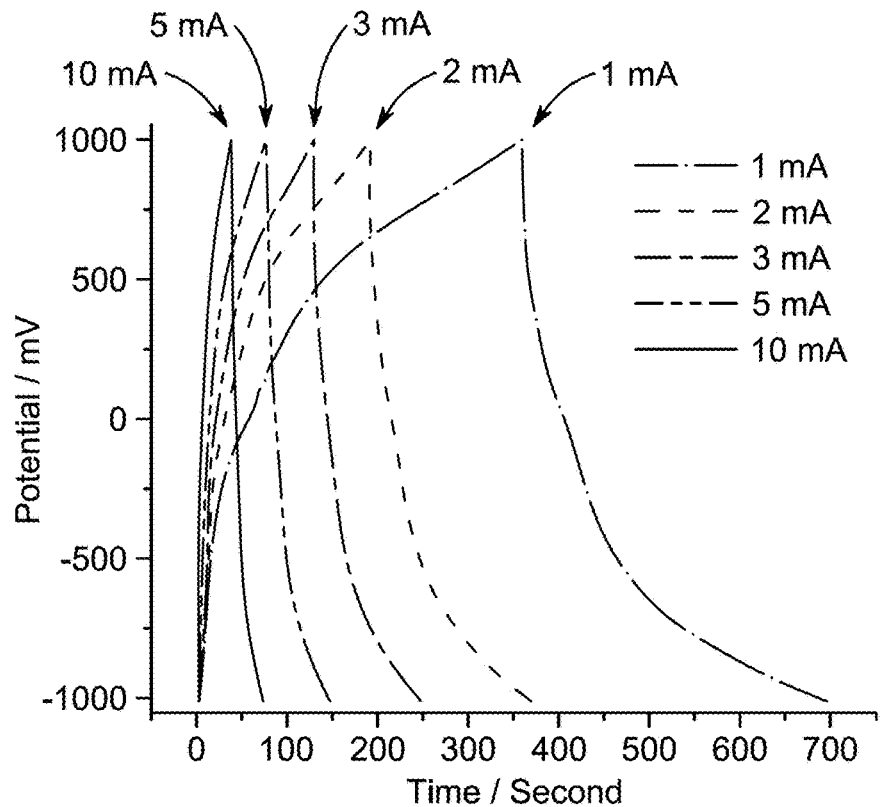
FIG. 4B is an overlay of CD curves of a supercapacitor having electrodes and gel polymer electrolyte PAMPS/$Mo_1$ obtained at different current densities ranging from 1 to 10 mA.
Figure 4C:
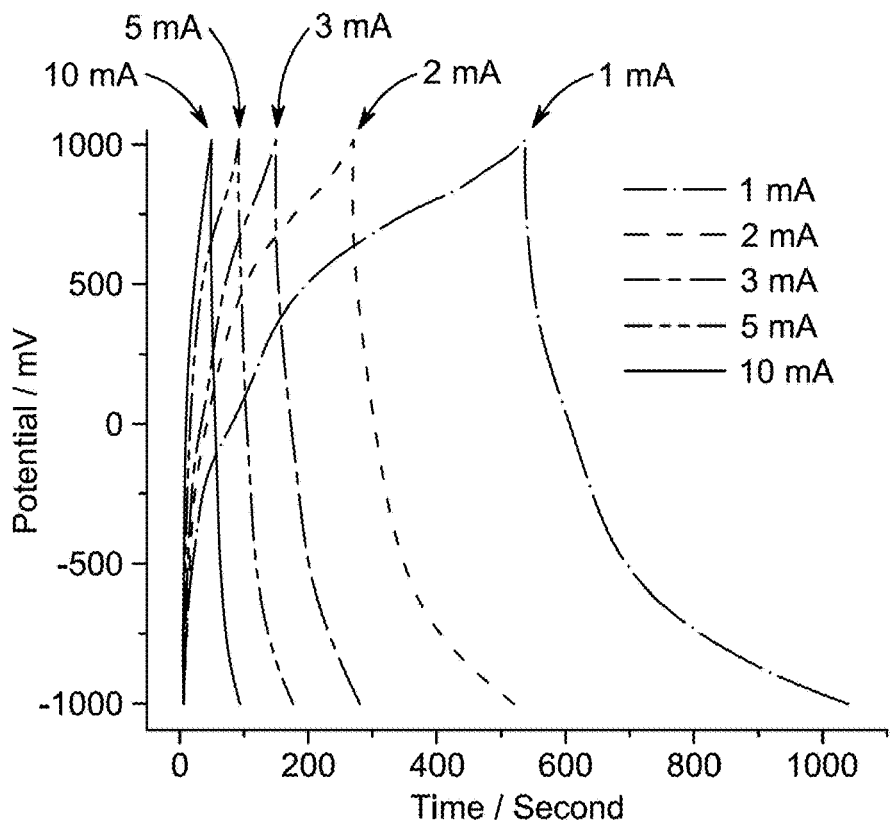
FIG. 4C is an overlay of CD curves of a supercapacitor having electrodes and gel polymer electrolyte PAMPS/$Mo_3$ obtained at different current densities ranging from 1 to 10 mA.
Figure 4D:
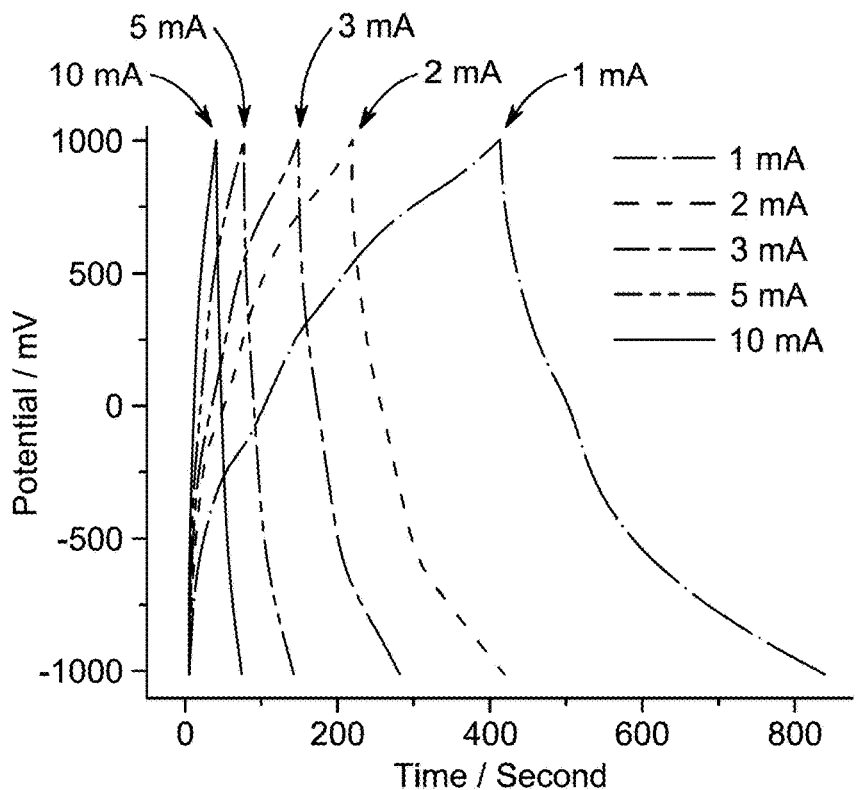
FIG. 4D is an overlay of CD curves of a supercapacitor having electrodes and gel polymer electrolyte PAMPS/$Mo_5$ obtained at different current densities ranging from 1 to 10 mA.

FIG. 4A shows the CD curves obtained for the PAMPS and PAMPS/Mo$_3$ supercapacitors. Symmetric supercapacitors were operated at constant applied current densities. Typical CD curves for the PAMPS based supercapacitor were obtained under conditions of charge to 1 V and discharge to 0.1 V at 1 mA with a mass of 1 mg active electrode material. CD curves of the PAMPS/Mo based system were obtained under different potential window ranging from −1 to 1 V, considering the redox peaks observed from the CV measurements. As seen in the FIG. 4A, the supercapacitor containing Mo revealed a discharge time twice as those without Mo. The oxidation and reduction reactions of the Mo ions in the hydrogel appeared to increase the charge storage ability of the supercapacitor.

Figure 4E:
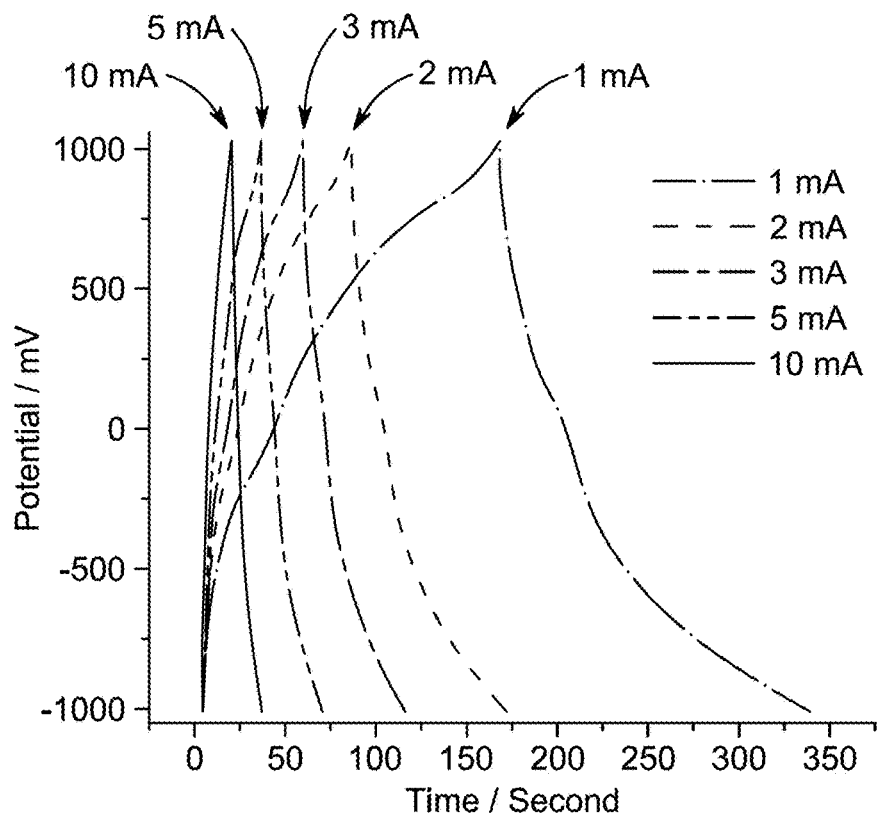
FIG. 4E is an overlay of CD curves of a supercapacitor having electrodes and gel polymer electrolyte PAMPS/$Mo_{10}$ obtained at different current densities ranging from 1 to 10 mA.
Figure 4F:
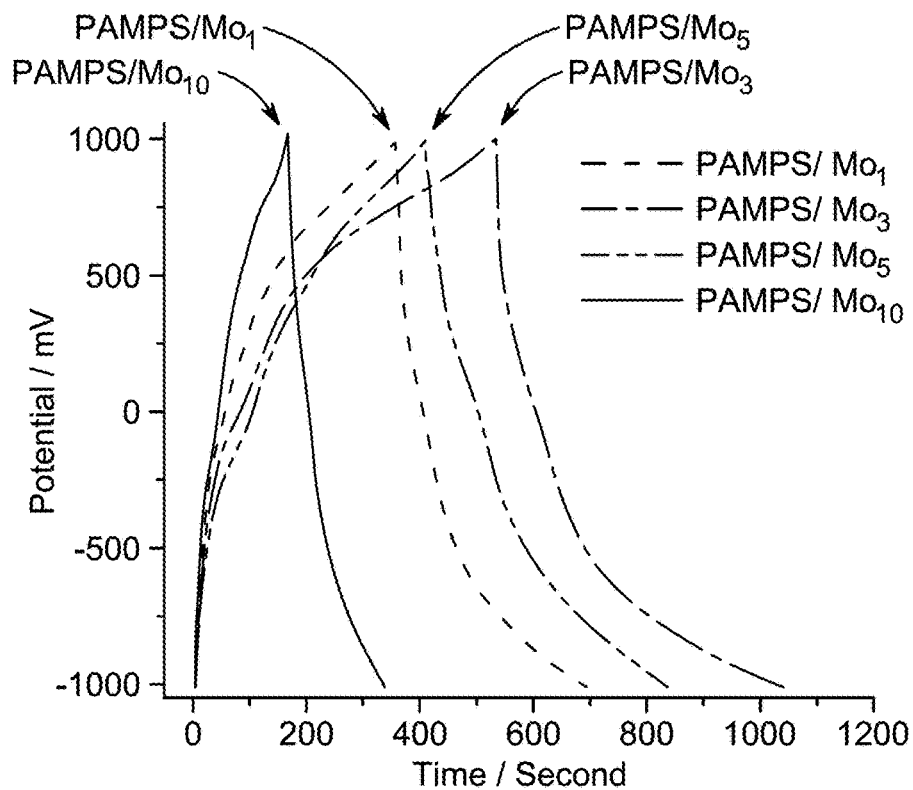
FIG. 4F is an overlay of CD curves of supercapacitors each having electrodes and different gel polymer electrolytes PAMPS/$Mo_1$, PAMPS/$Mo_3$, PAMPS/$Mo_5$, and PAMPS/$Mo_{10}$, respectively, obtained at a current density of 1 mA.

The CD cycles for the fabricated supercapacitor with different Mo doped polymer electrolytes were measured at different current densities. FIGS. 4B-E show the CD cycles for PAMPS/Mo$_x$ (x=1, 3, 5, and 10, respectively) based supercapacitors at current densities ranging from 1 mA to 10 mA. The shape of the CD curves clearly represented distinct characteristics compared to PAMPS based supercapacitor demonstrating the effect of Mo ions, which was in a good agreement with CV curves. Because higher current density can accumulate the same charge in less time, the charging discharging time kept shrinking as the current density increased. At a low current density (1 A·g$^{-1}$), no voltage drop was observed. A tendency of fast voltage drop behavior was often seen in supercapacitors over 5 A·g$^{-1}$, however, a limited capacitance reduction was calculated. This can be attributed to charge store ability supported by Mo ions in the hydrogel structure. FIG. 4E shows the CD curves for the electrolyte doped with the highest concentration of Mo giving the least amount of CD time. The maximum CD time was observed for PAMPS/Mo$_3$ electrolyte under the same potential window thereby giving the highest capacitance. FIG. 4F shows a comparison of the CD cycles among all fabricated devices with electrolyte doped with different concentrations of Mo at the same current density.

EXAMPLE 9

Results and Discussion: FIGS. 5A-E

Energy storage capability is one of the most important features of the components to be used in a supercapacitor to increase the rate capability. The ability of the supercapacitor to increase the discharge time and charging performance depends not only on the electrolyte but also on the active substance used as the current collector.

The specific capacitances of PAMPS and PAMPS/Mo$_x$ containing hydrogels were obtained at various current densities (1, 2, 3, 5 and 10 mA) as shown in FIG. 5A. The specific capacitances (C$_s$) were calculated at different current densities ranging from 1 A g$^{-1}$ to 10 A g$^{-1}$ using the following Eq. (1);

$$C_s = 2I\Delta t / w\Delta V \quad (1)$$

where I, $\Delta t$, w and $\Delta V$ are discharge current, discharge time, mass of the active material on the electrode, and voltage difference in discharging curve, respectively [M. Dirican, M. Yanilmaz, X. Zhang, Free-standing polyaniline-porous carbon nanofiber electrodes for symmetric and asymmetric supercapacitors, RSC Adv. 4 (2014) 59427-59435, incorporated herein by reference in its entirety]. The supercapacitor including PAMPS/Mo$_3$ electrolyte had the maximum C$_s$ of was calculated as 530 F·g$^{-1}$ at 1 A g$^{-1}$. The molybdate-free PAMPS hydrogel based supercapacitor had a capacitance value of 130 F·g$^{-1}$. The C$_s$ of other supercapacitors containing PAMPS/Mo$_1$, PAMPS/Mo$_5$ and PAMPS/Mo$_{10}$ electrolytes were 361, 442 and 175 F g$^{-1}$ at 1 A g$^{-1}$, respectively.

FIG. 5B illustrates the Ragone plots of pure PAMPS and the redox active metal doped hydrogels. The energy density, E$_d$ and power density, P$_d$ were evaluated according to given equations (2) and (3), $$E_d = (1/2)C_sV^2 \quad (2)$$

$$P_d = E_d/\Delta t \quad (3)$$

where V is maximum discharging voltage, C$_s$ is the specific capacitance, and $\Delta t$ is the discharge time [S. T. Gunday, E. Cevik, A. Yusuf, A. Bozkurt, Nanocomposites composed of sulfonated polysulfone/hexagonal boron nitride/ionic liquid for supercapacitor applications, J. Energy Storage. 21 (2019) 672-679, incorporated herein by reference in its entirety]. As seen from the plots, PAMPS/Mo$_3$ had an energy density of 265 Wh kg$^{-1}$ at a power density of 2.5 kW kg$^{-1}$, and still held the energy of 250 Wh kg$^{-1}$ at a power density of 20 kW kg$^{-1}$. Similarly, the energy density of PAMPS/Mo$_5$ was 225 Wh kg$^{-1}$ at a power density of 2 kWkg$^{-1}$ and it kept at 210 Wh kg$^{-1}$ at a power density of 18 kW kg$^{-1}$. It can be concluded that all systems demonstrated that a greater power density can be yielded and higher energy density can be preserved. The reason for high energy storage can be attributed to double layer formation within carbon-based electrodes and additional contribution from the faradaic reactions [S. Roldán, C. Blanco, M. Granda, R. Menéndez, R. Santamaria, Towards a Further Generation of High-Energy Carbon-Based Capacitors by Using Redox-Active Electrolytes, Angew. Chemie Int. Ed. 50 (2011) 1699-1701, incorporated herein by reference in its entirety]. Moreover, energy density and power density range shifted to lower values when the Mo content in PAMPS increased. This could be attributed to a complexation of Mo with the polymer network which may limit the transfer of ions during the charging and discharging processes.

The operational stability in terms of CD cycle number of the PAMPS/Mo based supercapacitor showed satisfactory result. The addition of extra redox species into the system has made the chemical reaction at the electrode electrolyte interface more complicated. A comparison between 10 and 2500 CD cycles were presented in FIG. 5C to demonstrate the stability of the device. Since the two CD cycles are similar, it is concluded that an increased capacitance has been achieved without compromising the stability.

Changes in the specific capacitance of all fabricated devices with increasing cycle numbers were plotted in FIG. 5D. All devices maintained their initial capacitance value after roughly up to 500 cycles. After that, however, a decline in capacitance was observed for Mo free PAMPS electrolyte cell and even more decrease observed for PAMPS/Mo$_{10}$ electrolyte. The fabricated Electrode/Hydrogel-Mo/Electrode symmetric system with PAMPS/Mo$_3$ has proved to be more stable, maintaining 92% of its initial capacitance value after 2,500 cycles. FIG. 5E-F show the flexibility of the supercapacitor which composed of PAMPS/Mo$_3$ electrolyte. FIG. 5G is a picture showing a successfully operated a light-emitting diode (LED) lit by the supercapacitor containing PAMPS/Mo$_3$ electrolyte.

EXAMPLE 10

As disclosed herein, a simple approach has been used to enhance the capacitance as well as the stability of carbon based supercapacitors using composite polymer hydrogel electrolyte. Specifically, redox mediated hydrogels were prepared by doping poly (2-acrylamido-2-methyl-1-propanesulfonic acid) (PAMPS) with ammonium molybdate at various doping ratios to produce hydrogel composites, PAMPS/Mo$_x$ (x=1, 3, 5, and 10). Characterizations of the electrolytes were performed by FT-IR, TGA, DSC, SEM, TEM and XRD. FTIR analysis shows new absorption peaks which confirm the chemical complexation between PAMPS and Mo ions. TGA analysis has revealed that the thermal stability of the polymer electrolyte was improved by the inclusion of Mo. The carbon-based supercapacitors were fabricated and characterized by cyclic voltammetry (CV). Cyclic voltammetry studies were performed to investigate the stability and performance of the supercapacitor. The specific capacitance of the supercapacitors fabricated using different electrolyte concentrations were further investigated by electrochemical impedance spectroscopy and galvanostatic charge-discharge (CD) experiments.

The maximum C$_s$ value of 530 F·g$^{-1}$ was obtained for symmetric supercapacitor including PAMPS/Mo$_3$ based electrolyte. This value was 130 F·g$^{-1}$ greater than that of supercapacitor built by PAMPS alone. Also, the device retained 92% of its initial performance even after 2,500 CD cycles. It was also demonstrated that all systems yielded higher power density while maintaining higher energy density. A successfully operated light-emitting diode (LED) was manufactured using the flexible Electrode/Hydrogel-Mo/Electrode. The method used in this work is straightforward and useful for large scale applications.

The invention claimed is:

1. A supercapacitor, comprising:
   a first electrode and a second electrode; and
   a gel polymer electrolyte arranged between the first and the second electrodes;
   wherein the first and the second electrodes each comprises:
      a metallic current collector; and
      a conductive layer comprising a conductive carbon and a polymer binder disposed on the current collector,
   wherein the polymer gel electrolyte is in electrical contact with the conductive layers of the first and the second electrodes, and
   wherein the gel polymer electrolyte comprises:
      a hydrogel matrix comprising water and a copolymer comprising 2-acrylamido-2-methyl-1-propanesulfonic acid (AMPS) and at least one comonomer selected from the group consisting of 2-hydroxyethyl methacrylate, 3-sulphopropyl acrylate, 2-sulphoethyl methacrylate and N-vinylpyrrolidone; and a molybdate(VI) salt dispersed in the hydrogel matrix, wherein the molybdate(VI) salt is present in an amount of from 3.0 wt % to 20.0 wt % relative to a total weight of the hydrogel matrix.

2. The supercapacitor of claim 1, wherein the molybdate (VI) salt is at least one selected from the group consisting of ammonium orthomolybdate $((NH_4)_2MoO_4)$, ammonium heptamolybdate $((NH_4)_6Mo_7O_{24})$, and ammonium dimolybdate $((NH_4)_2Mo_2O_7)$.

3. The supercapacitor of claim 1, wherein the molybdate (VI) salt is ammonium orthomolybdate.

4. The supercapacitor of claim 1, wherein the gel polymer electrolyte is substantially amorphous.

5. The supercapacitor of claim 1, wherein the molybdate (VI) salt is at least one selected from the group consisting of an ammonium molybdate(VI), a lithium molybdate(VI), a sodium molybdate(VI), and a potassium molybdate(VI).

6. The supercapacitor of claim 1, wherein the polymer gel electrolyte comprises 3 wt % to 7 wt % of the molybdate(VI) salt relative to a total weight of the hydrogel matrix.

7. The supercapacitor of claim 1, wherein the conductive layer comprises a a conductive organic polymer.

8. The supercapacitor of claim 7, wherein the conductive layer comprises a conductive carbon which is at least one selected from the group consisting of single-walled carbon nanotubes and multi-walled carbon nanotubes.

9. The supercapacitor of claim 7, wherein the conductive carbon is active carbon.

10. The supercapacitor of claim 1, wherein the metallic current collector comprises at least one metal selected from the group consisting of aluminum, gold, silver, copper, platinum, nickel, titanium, and iron.

11. The supercapacitor of claim 9, wherein the metallic current collector is aluminum.

12. The supercapacitor of claim 1, wherein the conductive layer comprises at least one polymer binder selected from the group consisting of polyvinylidene fluoride, polyvinylidene chloride, and polytetrafluoroethylene.

13. The supercapacitor of claim 6, which has a specific capacitance ($C_s$) of 360-550 F/g at a current density in a range of 1-10 A/g.

14. The supercapacitor of claim 6, which has an energy density in a range of 200-280 W·h/kg.

15. The supercapacitor of claim 6, which has a power density in a range of 2-20 kW/kg.

16. An electronic device, comprising the supercapacitor of claim 1.

* * * * *